United States Patent
Utsunomiya

(10) Patent No.: US 6,885,525 B1
(45) Date of Patent: Apr. 26, 2005

(54) MAGNETIC HEAD POSITIONING MECHANISM WITH LONGITUDINAL PIEZO-ELECTRIC ELEMENTS

(75) Inventor: Motoyasu Utsunomiya, Tokyo (JP)

(73) Assignee: TDK Corporation, Tokyo (JP)

(*) Notice: Subject to any disclaimer, the term of this patent is extended or adjusted under 35 U.S.C. 154(b) by 425 days.

(21) Appl. No.: 09/694,171

(22) Filed: Oct. 23, 2000

(30) Foreign Application Priority Data

Oct. 27, 1999 (JP) .......................................... 11-305440

(51) Int. Cl.[7] ............................................. G11B 21/24
(52) U.S. Cl. ................................................. 360/294.4
(58) Field of Search ......................... 360/294.4, 294.6, 360/264.5

(56) References Cited

U.S. PATENT DOCUMENTS

| | | | |
|---|---|---|---|
| 5,764,444 A | * | 6/1998 | Imamura et al. ......... 360/294.4 |
| 5,898,544 A | * | 4/1999 | Krinke et al. ............ 360/264.5 |
| 6,043,957 A | * | 3/2000 | Hattori et al. ........... 360/294.3 |
| 6,233,124 B1 | * | 5/2001 | Budde et al. ............. 360/294.4 |
| 6,297,936 B1 | * | 10/2001 | Kant et al. ................ 360/294.4 |

* cited by examiner

*Primary Examiner*—David D. Davis
(74) *Attorney, Agent, or Firm*—Scully, Scott, Murphy & Presser

(57) ABSTRACT

A magnetic head positioning mechanism is provided which is excellent in shock-resistance and can achieve high positioning accuracy. By constructing the magnetic head positioning mechanism so that a fine actuator section is composed of an actuator spring made from a thin steel plate, a base plate made from a thick steel plate to be junctioned to the actuator spring, stiffness of the fine actuator section in a vertical direction can be improved with flexibility of a driving spring section mounted on the actuator spring being still kept, that is, with sufficient positioning accuracy and satisfactory stroke being maintained. Moreover, by designing a strength of the fine actuator section so that the actuator spring and a holder arm do not overlap when the base plate is connected to the holder arm, the fine actuator section can be made thin and implementing of the fine actuator section among narrow plates in a positioning device is made easy.

24 Claims, 18 Drawing Sheets

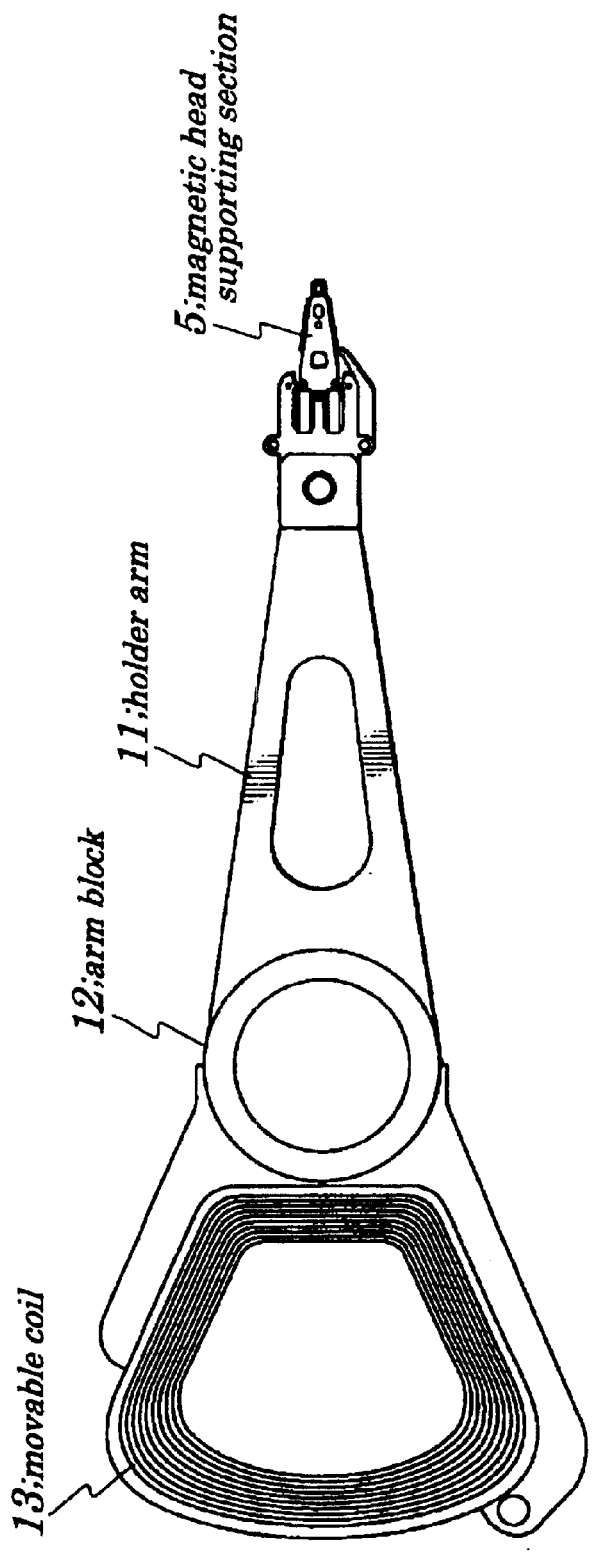
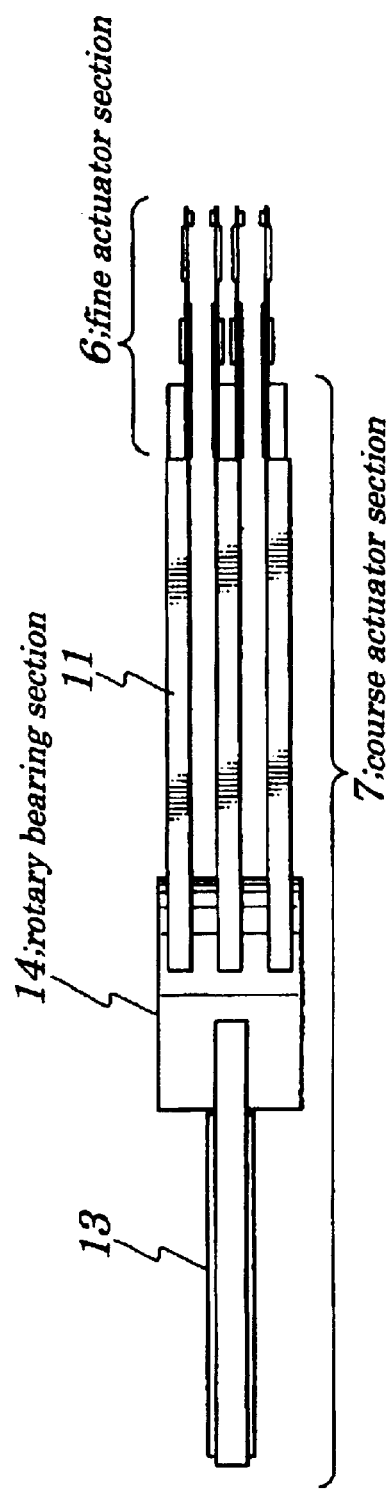
FIG.1A
FIG.1B

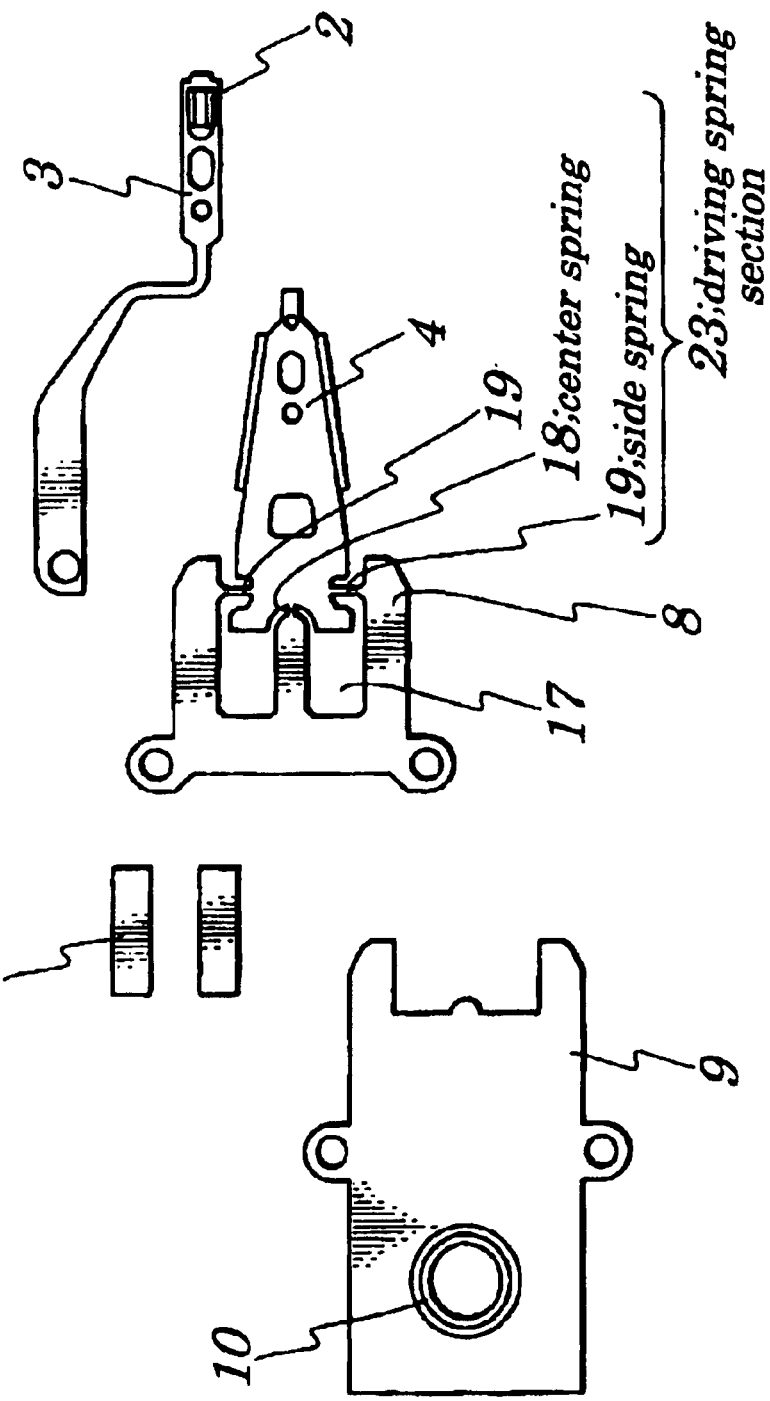

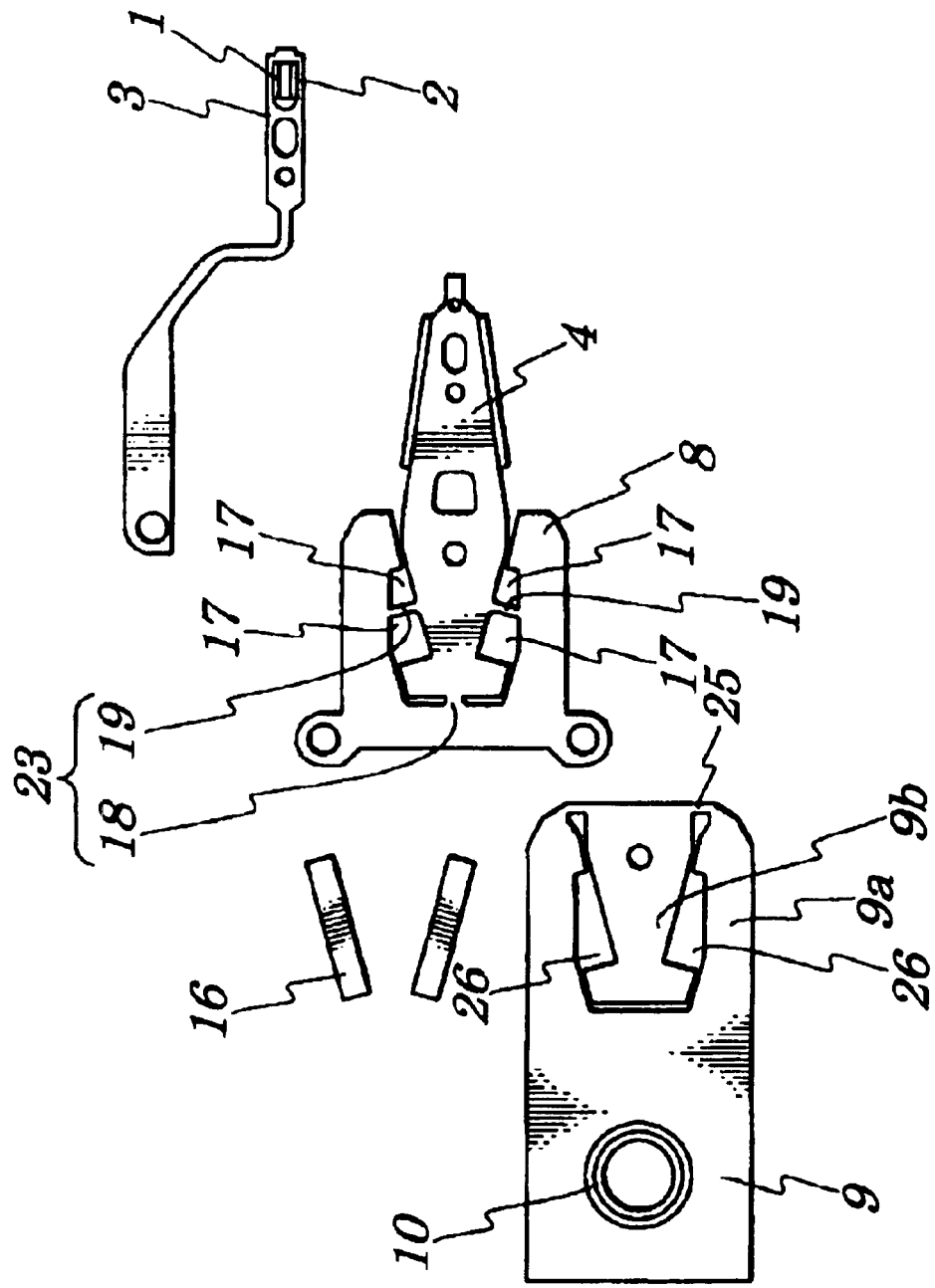

MAGNETIC HEAD POSITIONING MECHANISM WITH LONGITUDINAL PIEZO-ELECTRIC ELEMENTS

BACKGROUND OF THE INVENTION

1. Field of the Invention

The present invention relates to an improved magnetic head positioning mechanism for disk devices including magnetic disks or optical disks.

The present application claims the priority of Japanese Patent Application No. Hei11-305440 filed on Oct. 27, 1999, which is hereby incorporated by reference.

2. Description of the Related Art

Recording density of magnetic disks is increasing at a rate of 60% or more annually as technology to increase a BPI (Bit Per Inch) and/or TPI (Track Per Inch) improves. In order to implement high BPI devices, in addition to a reduction in an amount of floating of a magnetic head, introduction of the magnetic head with high sensitivity and highly-efficient signal processing, technology of positioning the magnetic head with high accuracy is required.

In a case of the recording density of 1 $Gb/in^2$, for example, density in a direction of a track is 8 kTPI or less and its track pitch is about 3 $\mu$m to 4 $\mu$m. However, to obtain the recording density of 10 $Gb/in^2$, since its track density has to be 25 kPTI or more and its track pitch has to be lm or less, a magnetic head positioning accuracy of 0.1 $\mu$m or less (being equivalent to about 10% of the track pitch) is needed.

FIGS. 14A, 14B, 14C and 15 show a conventional magnetic head positioning mechanism used in magnetic disk devices. As shown in FIGS. 14A and 14B, a magnetic head supporting section (suspension) 5 is composed of a gimbal spring 3 to hold a slider 2 on which a magnetic head is mounted, a load beam 4 to impose a predetermined pressing load on the slider 2 and a base plate 9 and, as shown in FIG. 14C, the magnetic head supporting section 5 is connected, via a boss section 10 formed in the base plate 9, to a holder arm 11 in a caulked state.

Base sections of a plurality of holder arms 11 to hold the magnetic head supporting section 5, as shown in FIG. 14C, constitutes integrally an arm block 12. The arm block 12 holding the magnetic head supporting section 5 is mounted through a rotary bearing section 14 in a magnetic disk device in a manner that it can rotate freely.

As shown in FIG. 15, a movable coil 13 is mounted to an end portion of the arm block 12. A voice coil motor (VCM) is composed of the movable coil 13 and an external fixing magnetic circuit 15 mounted in the magnetic disk device. Such a voice coil motor is adapted to apply a predetermined driving current to the movable coil 13 to generate a driving force which drives the arm block 12 holding the magnetic supporting section 5 to be rotated on a circular arc track in a seek direction (that is, in a direction of a diameter of the magnetic disk) and also drives a magnetic head 1 to perform a positioning operation to find a target track on the magnetic disk (this method is called a "rotary actuator method").

The positioning operation described herein includes a seek operation (or a tracking operation) to move the magnetic head 1 from an arbitrary track place to a target place and a follow operation to cause the magnetic head 1 to follow the target track.

However, the conventional magnetic head positioning mechanism, since a plurality of magnetic heads 1 is driven simultaneously by one VCM mounted therein, cannot provide sufficient positioning accuracy, especially the track following accuracy in the follow operations required in high TPI positioning devices in which the positioning accuracy of 0.1 $\mu$m or less is needed.

To solve this problem, development of a two-stage actuator type magnetic head positioning mechanism is pursued in which each of the magnetic heads 1 is individually driven regardless of driving of the arm block 12 by the VCM.

Japanese Patent Application No. Hei10-355697 with a title "Magnetic head slider positioning mechanism" applied by the present inventor and being pending now, discloses an example of an HGA (Head Gimbal Assembly) two-stage actuator type magnetic head positioning mechanism incorporating piezo-electric elements as shown in FIGS. 16A and 16B.

In the disclosed HGA driving two-stage actuator type magnetic head positioning mechanism, as shown in FIGS. 16A and 16B, a magnetic head supporting section 5 is connected to a tip of an actuator spring 8 and a base portion of the actuator spring 8 is fixed to a holder arm (not shown). A pair of piezo-electric elements 16 is disposed, both being in parallel to each other, on the actuator spring 8, with a center axis of the actuator spring 8 interposed and, while a magnetic head is following a track, a predetermined voltage (for example, ±30V) is alternately applied to each of the piezo-electric elements 16 to generate a driving force which makes flexible both a center spring 18 and side springs 19 mounted on the actuator spring 8, as shown in FIGS. 17A and 17B, and drives the magnetic head supporting section 5 to be rotated minutely in a track direction.

At this point, the piezo-electric elements 16 each being mounted so as to straddle each of driving voids 17, 17, with an "A" portion of each piezo-electric element 16 positioned on a holder arm side (not shown) being fixed as a fixing end, is adapted to expand and shrink a "B" portion of each piezo-electric element 16 positioned on a magnetic head side to make two side springs 19 flexible, which moves minutely the magnetic head supporting section 5 by using a "C" portion in the vicinity of the center spring 18 as a rotation axis.

However, the above HGA driving two-stage actuator type magnetic head positioning mechanism has shortcomings in that, since the driving voids must be mounted on distorting operation portions of the piezo-electric elements 16, not only stiffness in a vertical direction is greatly impaired but also shock-resistance and load/unload durability are decreased. Though required stiffness in the vertical direction can be obtained by changing a geometry of driving spring sections including the center spring 18 or side springs 19 and/or by increasing thickness of a spring plate used for the center spring 18 or the side springs 19 to improve the spring stiffness, it also causes an increase in in-face rotary stiffness, thus leading to a great driving loss at a fine actuator section and to a narrow driving stroke of the magnetic head 1. This makes it difficult to achieve sufficient positioning accuracy and to apply the technology to high TPI positioning devices.

Moreover, another type of the HGA driving two-stage actuator type magnetic head positioning mechanism using piezo-electric elements is available in which driving voids are not formed in the driving portion, as shown in FIG. 18A. This conventional HGA driving two-stage actuator type magnetic head positioning mechanism is so constructed that piezo-electric elements 16 are floated from an actuator spring 8 position due to a thickness of an adhesive layer 24 used to stick both ends of the piezo-electric element 16 to the actuator spring 8, which serves to avoid interference between expanding and shrinking portions of the piezo-electric elements 16 and the actuator spring 8, as shown in FIG. 18B. However, since the thickness of the adhesive layer 24 is as small as about 10 μm, there are risks of contact of the piezo-electric elements 16 with the actuator spring 8 and/or a short-circuit between them.

Furthermore, a same trade-off between the stiffness in a vertical direction and the rotary stiffness occurs structurally in the actuator spring 8 as in a case of the example shown in FIG. 16. That is, if stiffness of a driving spring section is increased to ensure shock-resistance and load/unload durability of the actuator spring 8, a driving loss becomes greater, thus making it impossible to obtain a sufficient moving range, while, if the stiffness of the driving spring section is decreased to minimize the driving loss, it is impossible to ensure shock-resistance and/or load/unload durability.

In the conventional single-actuator-type magnetic head positioning mechanism as shown in FIGS. 14A, 14B, 14C and 15, when the magnetic head supporting section 5 is connected to the holder arm 11, a method is used in which a boss section 10 formed in the load beam 4 is fitted into a mounting hole formed in the holder arm 11 and a swage is inserted with pressure and then caulking is performed. This is because the magnetic head supporting section can be easily positioned and a sufficient connection strength can be obtained. This method is also used widely as a mounting method being excellent in assembly workability, in a case of combining the swage insertion with pressure with application of the adhesive, because a leak of the adhesive to positioning jigs can be effectively prevented by the boss section serving as a wall against the leak.

At this point, since press forming is applied to the boss working, thick materials with plasticity are used. Since the load beam 4 used to produce a pressing load has to be constructed of thin materials with toughness, the boss section 10 formed in a base plate made from materials with plasticity, as shown in FIG. 14A, is junctioned integrally to the load beam 4, a whole of which is connected to the holder arm 11.

In the method of mounting the magnetic head supporting section 5 for the HGA driving two-stage actuator type magnetic head positioning mechanism as shown in FIG. 14A, since the actuator spring 8 having the driving spring section has to be constructed of thin plates with toughness, the press forming is not performed directly on the boss section 10. Therefore, the base plate 9 having the boss section 10 is prepared as a separate member and then the base plate 9 is integrally junctioned to the actuator spring 8, the whole of which is then connected to the holder arm 11. In this method, however, due to an increased number of assembled parts, productivity of the positioning device is decreased and due to increased thickness of the fine actuator section, mounting of the positioning mechanism among narrow plates or parts in a small magnetic disk is made difficult.

SUMMARY OF THE INVENTION

In view of the above, it is an object of the present invention to provide a two-stage actuator type magnetic head positioning mechanism capable of providing excellent stiffness of an actuator spring in a vertical direction without an increase in its rotary stiffness and capable of ensuring shock-resistance and load/unload durability without sacrificing a driving stroke of a magnetic head at a fine actuator section. It is another object to provide the two-stage actuator type magnetic head positioning mechanism which can make it easy to mount the fine actuator section among narrow plates of arm blocks and which can serve to miniaturize a magnetic disk. It is still another object to provide the two-stage actuator type magnetic head positioning mechanism having a sufficient track following capability being suitable to small-sized high TPI positioning devices and high reliability of a life of a positioning device and of external shock-resistance.

According to a first aspect of the present invention, there is provided a two-stage actuator type magnetic head positioning mechanism including:

a plurality of fine actuator sections which minutely drives, by using a pair of piezo-electric elements mounted in the fine actuator sections, a magnetic head supporting section adapted to support a slider on which a magnetic head is attached;

a plurality of holder arms to support each of the fine actuator sections;

an arm block formed by integrally unifying the plurality of holder arms; and a voice coil motor to drive the arm block;

whereby the fine actuator section is composed of an actuator spring made from one thin steel plate and a base plate made from one thick steel plate, both of which overlap each other, and wherein a driving spring section being connected to the magnetic head supporting section is mounted on the actuator spring and, in a vicinity of the driving spring section, a pair of driving voids to absorb vibration of the magnetic head supporting section and extension/shrinkage of the piezo-electric elements is formed in a state being symmetrical to right and left with respect to a center axis of the actuator spring and wherein both end portions of the pair of piezo-electric elements are connected to the magnetic head supporting section and to the actuator spring in a manner that the end portions straddle each of the driving voids and wherein the base plate is junctioned to one face of the actuator spring in a manner that the base plate covers the pair of driving voids.

By configuring as above, a seek operation for positioning of the magnetic head is performed by vibrating a whole arm block using the voice coil motor, and accurate positioning operation of the magnetic head and/or a following operation are performed by applying a voltage alternately to each of the pair of piezo-electric elements to expand or shrink the piezo-electric elements which causes the actuator spring to be made flexible and the magnetic head supporting section to vibrate. Since the base plate composed of the thick steel plate is junctioned to the actuator spring in a manner that it covers the driving voids, even if sufficient driving voids are formed in the actuator spring, the stiffness of the actuator spring in a vertical direction, shock-resistance and load/unload durability can be fully ensured. Thus, both excellent stiffness in the vertical direction and satisfactory driving stroke in a direction of head driving can be simultaneously achieved in the magnetic head supporting section.

In the foregoing, a preferable mode is one wherein the base plate is opened at a place where the base plate and the magnetic head supporting section overlap each other and is junctioned to the actuator spring in a manner that the base plate surrounds external edges of the driving spring section of the actuator spring.

By configuring as above, interference among the base plate, driving spring section and magnetic head supporting section can be prevented and a resistance in a head driving direction in the magnetic head supporting section can be reduced, thus providing further more accurate positioning.

Also, a preferable mode is one wherein the driving spring section of the actuator spring is composed of a short plate spring and of a pair of side springs made from long plate springs and wherein a center spring is disposed on the center axis of the actuator spring while each of the side springs is disposed, with the center spring interposed between the side springs, in a direction being intersected almost at right angles to the center axis of the actuator spring and wherein the base plate is junctioned to the actuator spring, at least, at a root area of the center spring and the side springs.

By configuring as above, the base plate is junctioned to the actuator spring at the root area of the center spring and side springs, that is, at a place where stresses centralize most in the actuator spring, the stiffness of the actuator spring in the vertical direction can be improved and deformation of the actuator spring can be prevented.

Also, a preferable mode is one wherein the pair of driving voids to absorb vibration of the magnetic head supporting section and extension/shrinkage of the piezo-electric elements is formed at both sides of a mounting position of the magnetic head supporting section in a state being symmetrical to the right and left with respect to the center axis of the actuator spring and wherein each of the pair of piezo-electric elements is connected to the magnetic head supporting section and to the actuator spring in a manner that each of the piezo-electric elements straddles each of the driving voids along both sides of the mounting position of the magnetic head supporting section and the driving spring section is mounted between the actuator spring and the magnetic head supporting section.

By configuring as above, driving voids are formed on both sides of the mounting position of the magnetic head supporting section and piezo-electric elements are mounted along both sides of the mounting position of the magnetic head supporting section in a manner that the piezo-electric elements straddle the driving voids. Since the base portion of the mounting position of the magnetic head supporting section, driving voids and piezo-electric elements are thus arranged all in a transverse direction with respect to the center axis of the actuator spring, an overall size of the magnetic head supporting section, its length in particular, can be reduced greatly.

Also, a preferable mode is one wherein the driving spring section of the actuator spring is composed of the center spring made from one short plate spring and the pair of side springs made from long plate springs and wherein the center spring is connected to the magnetic head supporting section and to the actuator spring on the center axis of the actuator spring at an end portion of the magnetic head supporting section being nearer to the holder arm while each of the side springs is connected to the magnetic head supporting section and to the actuator spring in a manner that each of the side springs straddles each of the driving voids and in a manner that each of the side springs intersects almost at right angles to each of the piezo-electric elements.

By configuring as above, elastic deformation of the side spring causes the magnetic head supporting section to vibrate around the center spring disposed at an end portion of the magnetic head supporting section being nearer to the holder arm. Thus, since the magnetic head supporting section is able to vibrate over a long span, movable range of the magnetic head mounted at a tip of the magnetic head supporting section is made larger, providing stable positioning of the magnetic head.

Also, a preferable mode is one wherein a part of the base plate on which the magnetic supporting section is laid is separated from a main portion of the base plate in a state in which the separated part of the base plate is nested in the main portion of the base plate and is junctioned to the magnetic head supporting section and second driving voids being laid on other driving voids so that the second driving voids and the other driving voids overlap each other are formed between the portion of the base plate separated to be nested in the main portion of the base plate and the main portion of the base plate and wherein both end portions of each of the pair of piezo-electric elements are connected to the magnetic head supporting section and to the actuator spring through the portion of the base plate separated to be nested in said main portion of the base plate and the main portion of the base plate in a manner that each of the piezo-electric elements straddles each of the second driving voids.

By configuring as above, not only the actuator spring but also base portion of the magnetic head supporting section can be reinforced by the thick steel plate, thus improving the stiffness of the magnetic head supporting section in the vertical direction.

Also, a preferable mode is one wherein the pair of driving voids are formed so as to be intersected in a slanting direction in a manner that a distance between the pair of driving voids is increased gradually toward the magnetic head from the holder arm side.

By configuring as above, since transverse width of the magnetic head supporting section is made larger toward the center portion of the magnetic head supporting section from the end portion nearer to the holder arm which constitutes a center for vibration of the magnetic head supporting section, the stiffness of the magnetic head supporting section can be improved.

Also, a preferable mode is one wherein length of the actuator spring is set so as to end at a tip of the holder arm so that the actuator spring being junctioned to the base plate and the holder arm do not overlap each other when the base plate is connected to the holder arm.

By configuring as above, since the base plate and the holder arm overlap each other only at a connection point between the magnetic head supporting section and the holder arm, overall thickness can be reduced more when compared with a case where the actuator spring is inserted, thus making easier implementation of the fine actuator section among narrow parts.

Furthermore, a preferable mode is one wherein a boss section is formed on the base plate so that the base plate is connected to the holder arm.

By configuring as above, since the boss section is formed on the base plate side where plastic working is easier, working is made easy, thus improving productivity of the positioning device.

BRIEF DESCRIPTION OF THE DRAWINGS

The above and other objects, advantages and features of the present invention will be more apparent from the following description taken in conjunction with the accompanying drawings in which:

FIG. 1A is a top view showing an overall configuration of a magnetic head positioning mechanism according to a first embodiment of the present invention;

FIG. 1B is a side view of the magnetic head positioning mechanism according to the first embodiment;

FIG. 7 is a diagram showing configurations of parts constituting the fine actuator section of the magnetic head positioning mechanism of the second embodiment of the present invention;

FIG. 12 is a diagram showing configurations of parts constituting the fine actuator section of the magnetic head positioning mechanism of the fourth embodiment of the present invention;

DETAILED DESCRIPTION OF THE PREFERRED EMBODIMENTS

Best modes of carrying out the present invention will be described in further detail using various embodiments with reference to the accompanying drawings.

First Embodiment

Figure 2A:
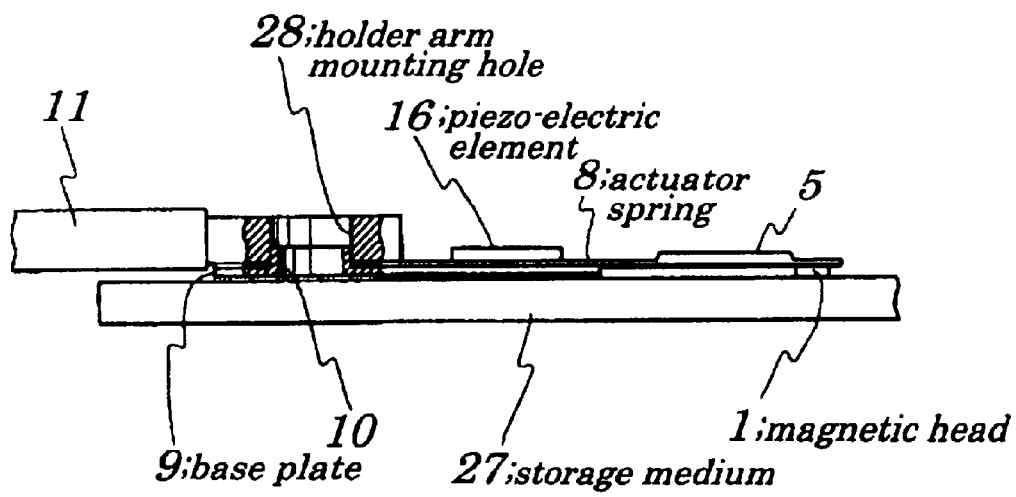
FIG. 2A is a side view showing main components of the magnetic head positioning mechanism according to the first embodiment of the present invention.
Figure 2B:
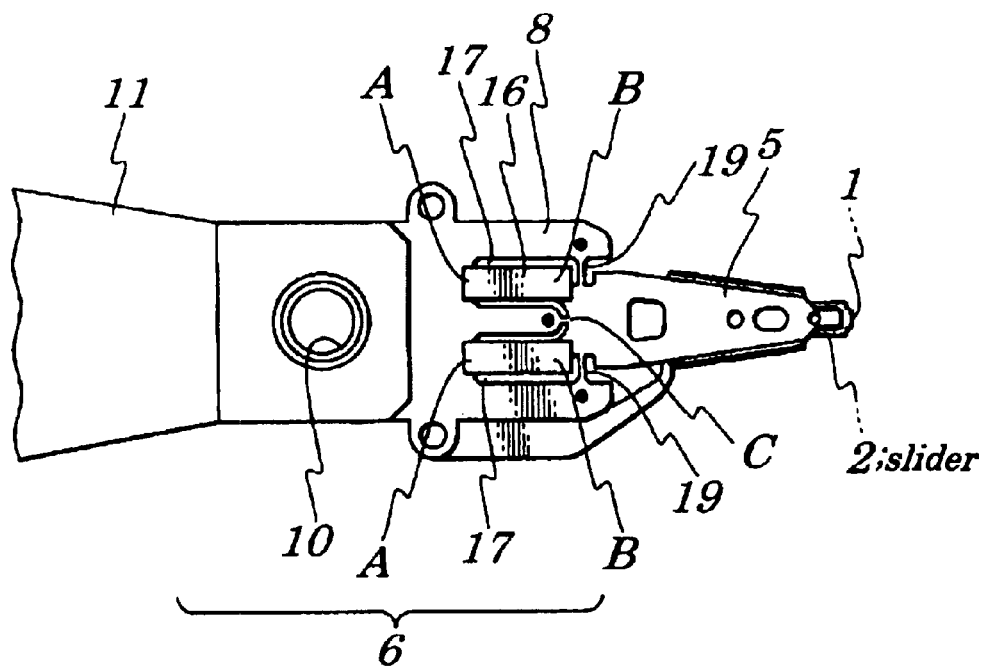
FIG. 2B is a back view showing main components of the magnetic head positioning mechanism according to the first embodiment.
Figure 3A:
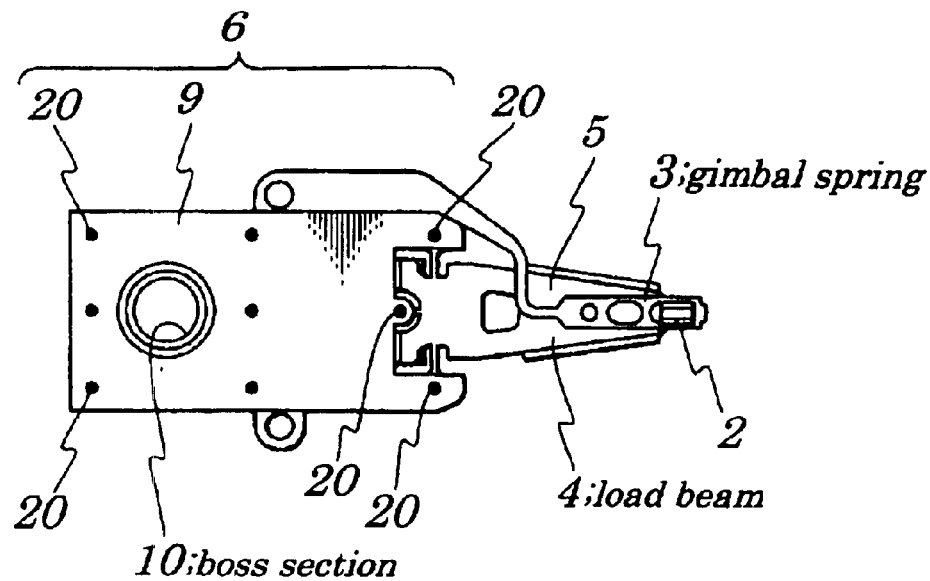
FIG. 3A is a top view of a fine actuator section constituting the magnetic head positioning mechanism according to the first embodiment of the present invention.
Figure 3B:
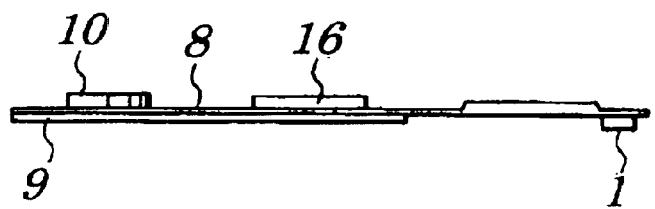
FIG. 3B is a side view of the fine actuator section constituting the magnetic head positioning mechanism according to the first embodiment.
Figure 3C:
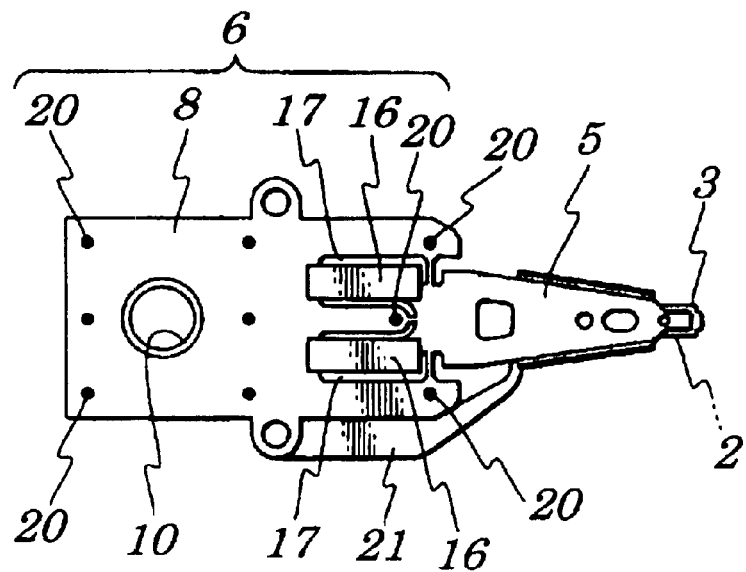
FIG. 3C is a back view of the fine actuator section constituting the magnetic head positioning mechanism according to the first embodiment of the present invention.
Figure 4A:
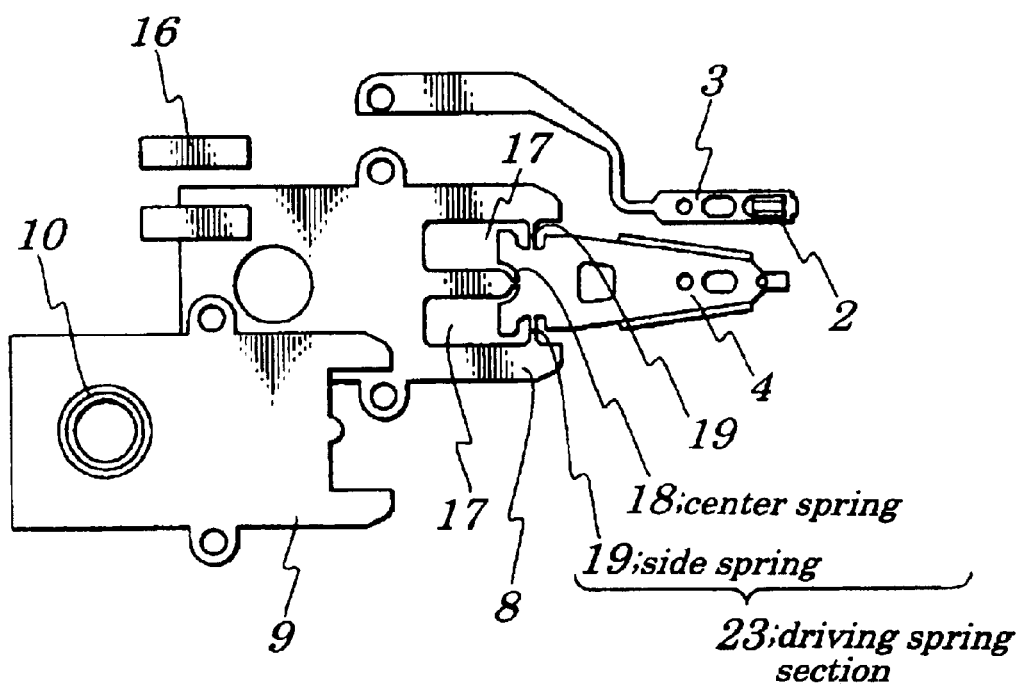
FIG. 4A is a diagram showing parts constituting the fine actuator section of the magnetic head positioning mechanism according to the first embodiment of the present invention.
Figure 4B:
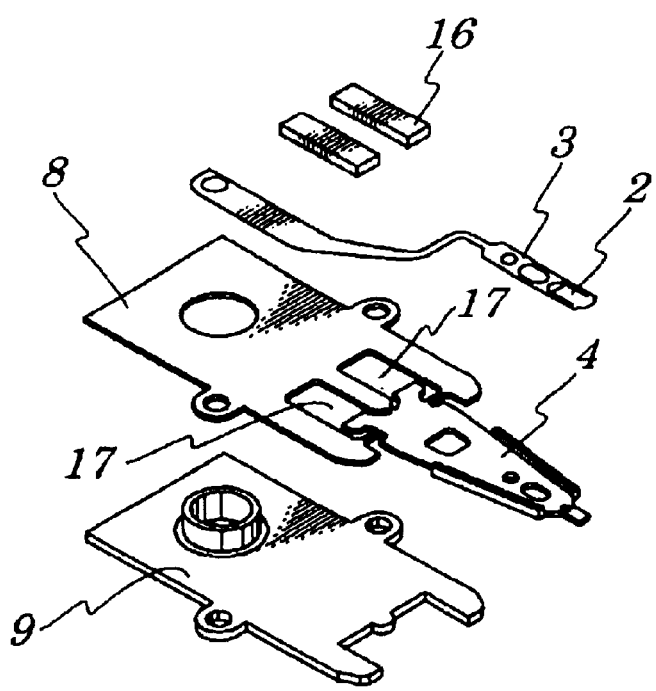
FIG. 4B is a perspective view showing parts constituting the fine actuator section of the magnetic head positioning mechanism according to the first embodiment.

FIG. 1A is a top view showing an overall configuration of a magnetic head positioning mechanism according to a first embodiment of the present invention and FIG. 1B is a side view of the magnetic head positioning mechanism according to the first embodiment. FIG. 2A is a side view showing main components of the magnetic head positioning mechanism according to the first embodiment and FIG. 2B is a back view showing main components of the magnetic head positioning mechanism according to the first embodiment. FIG. 3A is a top view of a fine actuator section constituting the magnetic head positioning mechanism according to the first embodiment, FIG. 3B is a side view of the fine actuator section constituting the magnetic head positioning mechanism according to the first embodiment and FIG. 3C is a back view of the fine actuator section constituting the magnetic head positioning mechanism according to the first embodiment. FIG. 4A is a diagram showing parts constituting the fine actuator section of the magnetic head positioning mechanism according to the first embodiment and FIG. 4B is a perspective view showing parts constituting the fine actuator section of the magnetic head positioning mechanism according to the first embodiment.

In description, a figure showing a face portion directing to a surface of a magnetic medium is defined as the "top view" and the figure showing a face portion existing on an opposite side of the face portion directing to the surface of the magnetic medium is defined as the "back view". Expressions of the top/back views are not related to directionality shown when the magnetic head positioning device is installed. A term "section" represents a unified whole to implement a function.

As shown in FIGS. 1A and 1B, the magnetic head positioning mechanism of the first embodiment is composed of a magnetic head supporting section 5 and two-stage type actuator having a fine actuator section 6 containing the magnetic head supporting section 5 and a course actuator 7. As shown in FIGS. 3A and 3B, the magnetic head supporting section 5 is composed of a floating-type or contact-type slider 2 on which a magnetic head 1 is mounted, a gimbal spring 3 to support the slider 2 and a load beam 4 to apply pressing power to the slider 2. As shown in FIG. 3C, the load beam 4 is integrally formed with an actuator spring 8 composed of one thin steel plate to obtain assembly workability. However, as shown in a third embodiment described later, the load beam 4 may be constructed in a manner that it is a separate part from the actuator spring 8.

The fine actuator section 6, as shown in FIGS. 3A and 3B, is composed of the actuator spring 8, piezo-electric elements 16 and a base plate 9. The fine actuator section 6, as shown in FIGS. 2A and 2B, is connected via a boss section 10 formed in the base plate 9 to a holder arm 11. Also, as shown in FIG. 3C, the fine actuator section 6 is provided with a FPC (Flexible printed cable).

An arm block (carriage) 12 composed of a plurality of holder arms 11 is provided with a movable coil 13 on its one end and constitutes a VCM in combination with an external fixing magnetic circuit (not shown) to form the course actuator 7, as shown in FIGS. 1A and 1B.

Figure 16A:
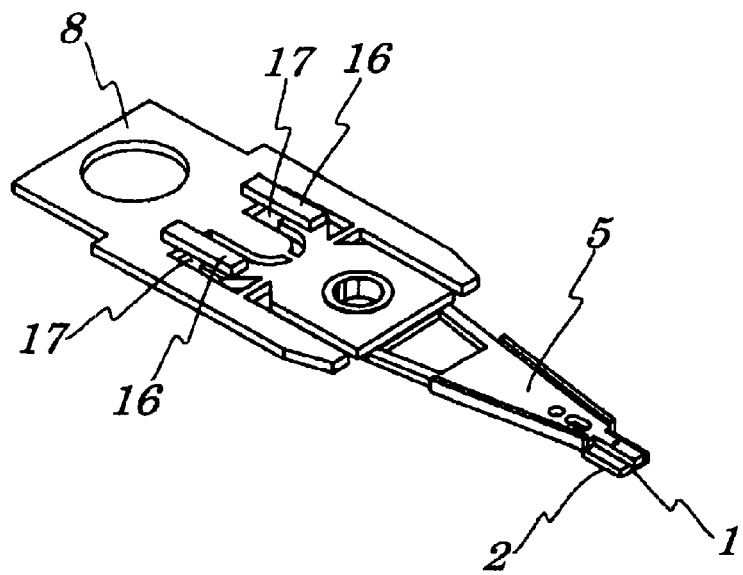
FIG. 16A is a perspective view showing a magnetic head supporting section of a two-stage actuator type magnetic head positioning mechanism as a related art.
Figure 16B:
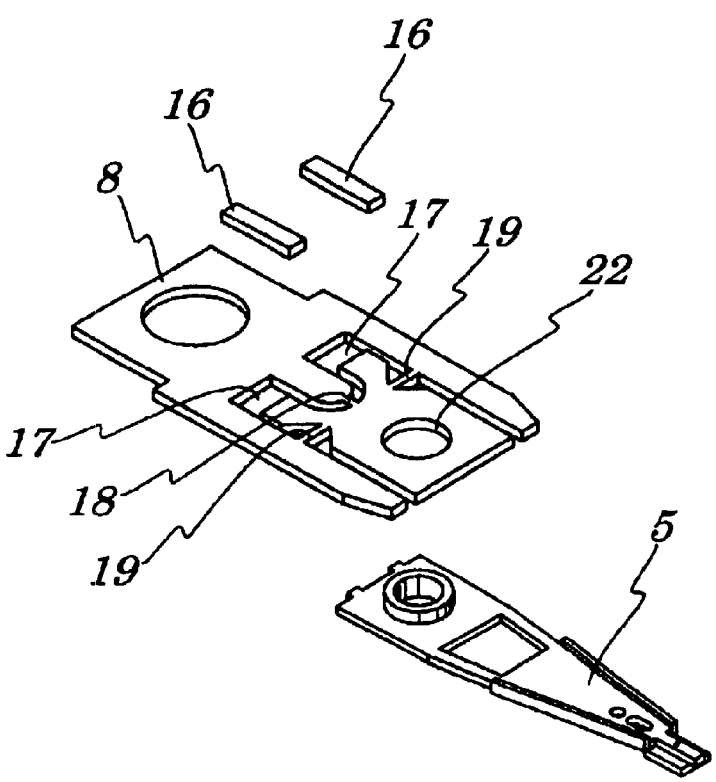
FIG. 16B is an exploded perspective view showing the magnetic head supporting section in exploded form.
Figure 17A:
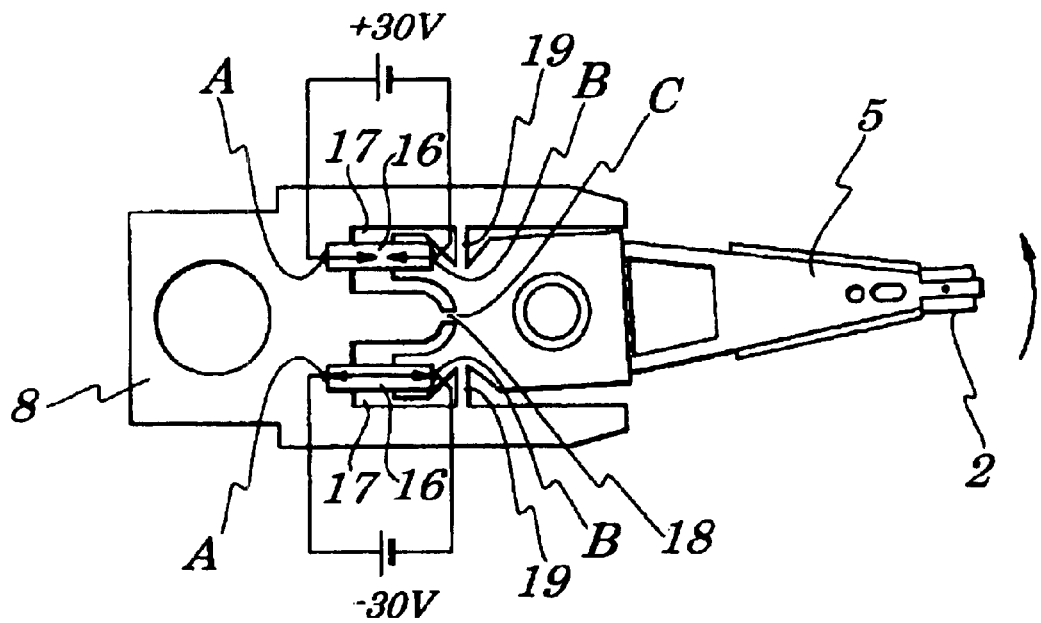
FIGS. 17A and 17B are top views explaining respectively an operational principle of the a two-stage actuator type magnetic head positioning mechanism.
Figure 17B:
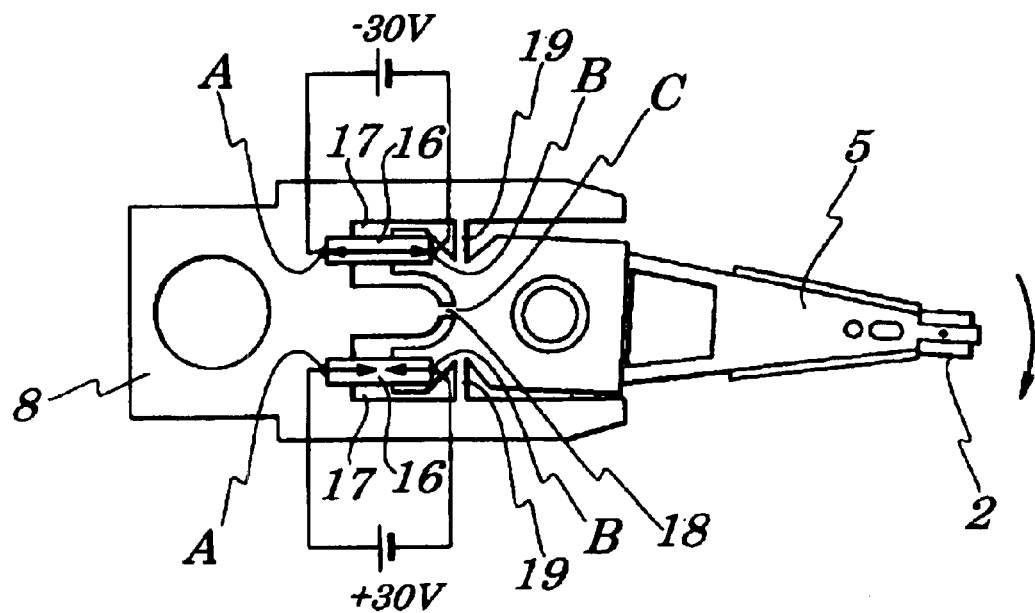
Figure 18A:
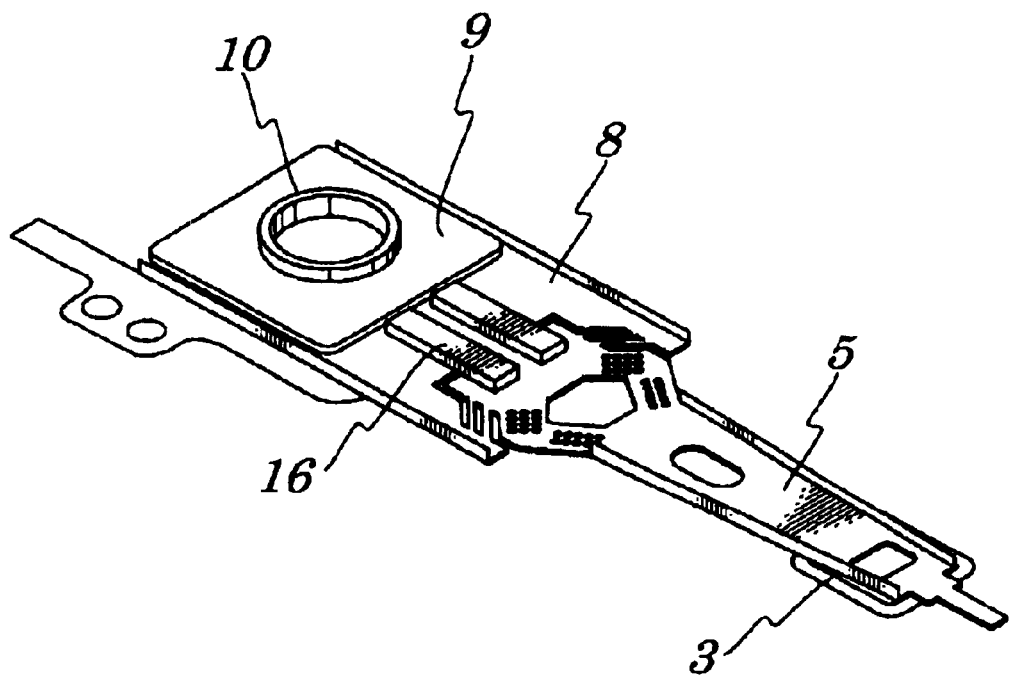
FIG. 18A is a perspective view showing a magnetic head supporting section of a conventional two-stage actuator type magnetic head positioning mechanism.
Figure 18B:
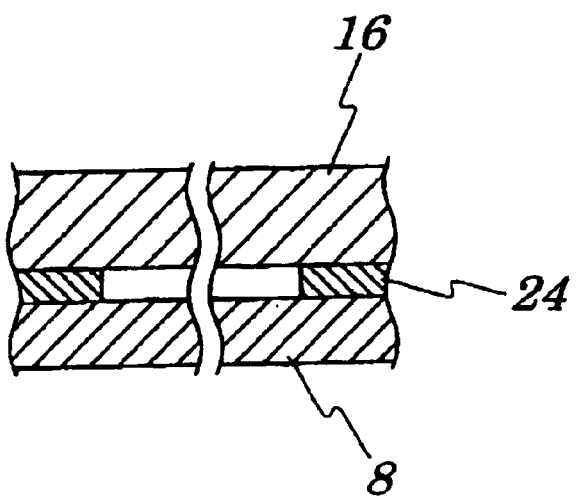
FIG. 18B is a cross-section view showing the piezoelectric elements and vicinity of the magnetic head supporting section.

As shown in FIGS. 2B and 3C, a pair of cuboid-shaped piezo-electric elements 16 is mounted, each straddling each driving void 17 and with a center axis of the actuator spring 8 interposed between the piezo-electric elements, on the actuator spring 8 both being disposed in parallel to each other. As shown in FIG. 4A, a driving spring section 23 is formed between the load beam 4 constituting a part of the magnetic head supporting section 5 and the actuator spring 8. Any kind of driving spring may be used so long as it has structurally low in-face rotary stiffness and high stiffness in its vertical direction. The driving spring section 23 of the first embodiment is composed of a pair of long I-shaped side springs 19 which are disposed so as to intersect in a direction perpendicular to the center axis of the actuator spring 8 and of one short I-shaped center spring 18 disposed on the center axis of the actuator spring 8 (refer to Japanese Patent Application No. Heil0-355697 and FIG. 16B). Thin plate materials with toughness such as SUS304 or a like are preferably used as materials for the actuator spring 8 and load beam 4 because properties as a spring material are required in this case.

The actuator spring 8 and the base plate 9 are laid in a manner that they overlap each other, except portions in which the load arm 4 is laid on the base plate 9 and portions in which the driving spring section 23 is mounted. The boss section 10 is formed on the base plate 9, by press working, at a connection point with the holder arm 11. To form the base plate 9, unlike in a case of the actuator spring 8, materials with plasticity are preferably selected to obtain workability at the boss section 10. The thickness of the base plate 9 is decided based on a tradeoff between the height of the boss section 10 and allowable mounting height.

An end portion of the base plate 9 disposed nearer to the magnetic head 1 is so constructed that the actuator plate 8 is laid on the base plate 9 in a manner that the driving voids 17 formed in the actuator spring 8 are covered and that the base plate 9 and actuator spring 8, both overlapping each other, surround external edges of the driving spring section 23. When the base plate 9 and actuator spring 8 are junctioned, for example, by a laser spot welding method, welding is carried out not only on junction positions shown on the base plate 9 as welding points 20 around the boss section 10 as shown in FIGS. 3A and 3B, but also on junction positions shown as welding points 20 in areas of the external edges of the driving spring section 23, that is, on a root area surrounding a fixing side of the center spring 18 and side springs 19.

As shown in FIG. 2A, the base plate 9 is disposed on a storage medium 27 side and the actuator spring 8 is laid on the base plate 9 and piezo-electric elements are mounted on the actuator spring 8 (on the holder arm 11 side). A through hole is formed on a position used to connect the holder arm 11 on the actuator spring 8 and the boss section 10 of the base plate 9 passes through the through hole of the actuator spring 8 and is fitted into a holder arm mounting hole 28.

If there is sufficient room for mounting parts at the fine actuator section 6, it is possible to mount the actuator spring 8 on the storage medium 27 side and the base plate 9 on the holder arm 11 side. However, in this case, since the piezo-electric elements 16 are to be connected in an opposed direction to the storage medium 27, there is the risk of a physical contact or electric short-circuit between the storage medium 27 and piezo-electric elements 16.

When the two-stage actuator described above drives minutely the magnetic head 1 to a seek direction, a voltage is applied to each of the piezo-electric elements 16 mounted on the actuator spring 8 in a manner that each of them has an opposite phase to make the driving spring section 23 flexible and to obtain a fine rotation of the magnetic head supporting section 5. At this point, as shown in FIG. 2B, each of the piezo-electric elements 16, with an "A" portion of each piezo-electric element 16 positioned on a holder arm side (not shown) being fixed to the actuator spring 8 as a fixing end, is adapted to expand and shrink a "B" portion of each piezo-electric element 16 serving as a driving end for each piezo-electric element 16 disposed on the magnetic head side, which causes two side springs 19 to be displaced using a "C" portion as a rotation axis which also corresponds positionally to a center of the two side springs 19 and then the magnetic head 1 to be driven for track following operations.

Thus, in the magnetic head positioning mechanism of the embodiment, since the actuator spring 8 and base plate 9 overlap each other on the driving voids 17 and they surround the edge portion of the driving spring 23, the area surrounding the driving voids 17 can be reinforced. This allows rotary stiffness of the driving spring 23 to be kept decreased and stiffness in the vertical direction of the fine actuator section 6 to be kept increased.

Figure 5A:
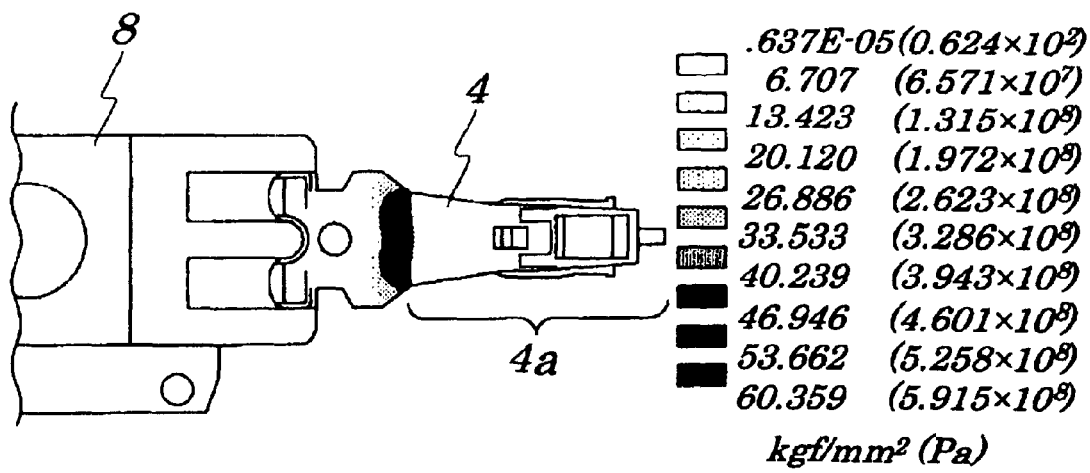
FIG. 5A is a diagram showing distribution of stress by vertical load in the fine actuator section of the magnetic head positioning mechanism according to the first embodiment of the present invention.
Figure 5B:
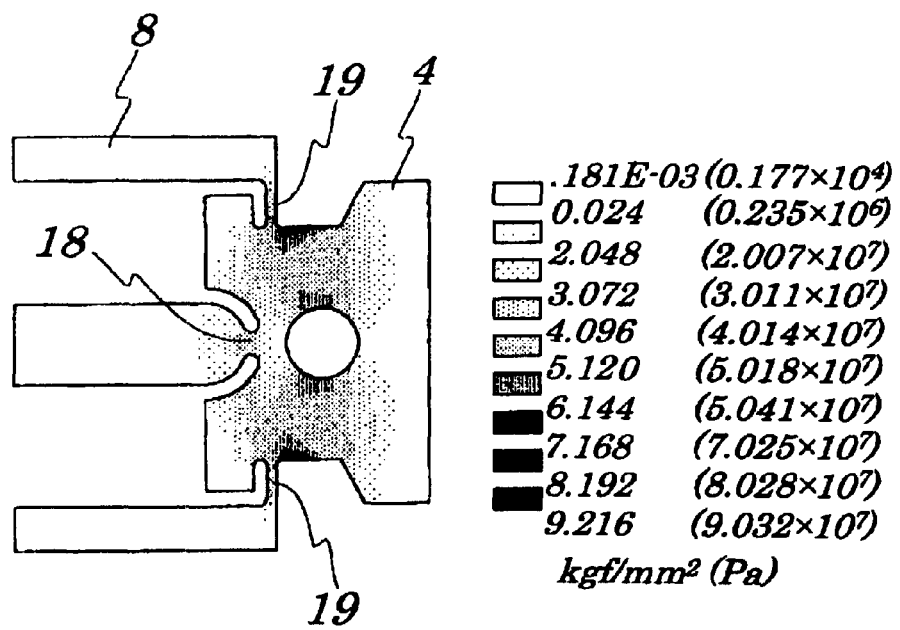
FIG. 5B is an enlarged diagram showing a part of the stress distribution diagram of FIG. 5A.

FIGS. 5A and 5B are diagrams showing distribution of stress obtained by simulation of the internal stress occurring when a load of about 2.5 g is imposed, with the fine actuator section 6 of the first embodiment being fixed at a connection place to the holder arm 11. As is apparent from FIG. 5A, a stress of $6 \times 10^8$ Pa is generated at a load-bending position 4a of the load beam 4 at the time of loading and unloading, however, there is only a stress of $9 \times 10^7$ at center spring 18 and side springs 19 of the actuator spring 8 as shown in FIG. 5B.

Figure 5C:
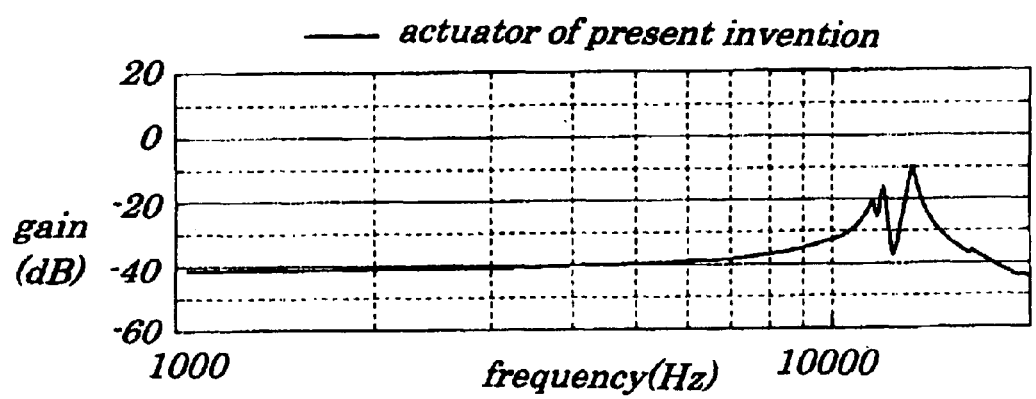
FIG. 5C is a diagram showing transmission characteristics of the fine actuator section in the magnetic head positioning mechanism according to the first embodiment.

FIG. 5C is a simulation diagram showing transmission characteristics at the magnetic head 1 position obtained when the piezo-electric elements 16 are driven, with the fine actuator section 6 of the first embodiment being fixed at the connection place to the holder arm 11. In the magnetic head positioning mechanism of the embodiment using the base plate 9 for reinforcing the area surrounding the driving spring section 23, since not only bending stiffness but also torsional stiffness can be increased in the fine actuator section 6, it is possible to obtain excellent vibrating characteristics being free from a resonance peak over a wide frequency band (>10 kHz).

Second Embodiment

Figure 6A:
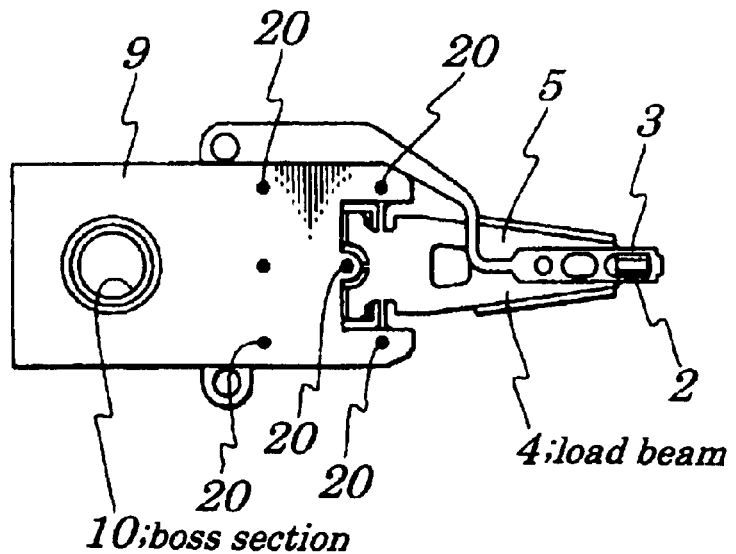
FIG. 6A is a top view of a fine actuator section of a magnetic head positioning mechanism according to a second embodiment of the present invention.
Figure 6B:
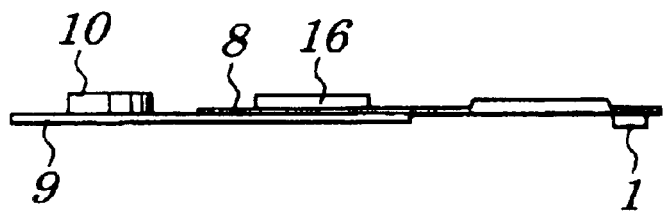
FIG. 6B is a side view of the fine actuator section of the magnetic head positioning mechanism according to the second embodiment.
Figure 6C:
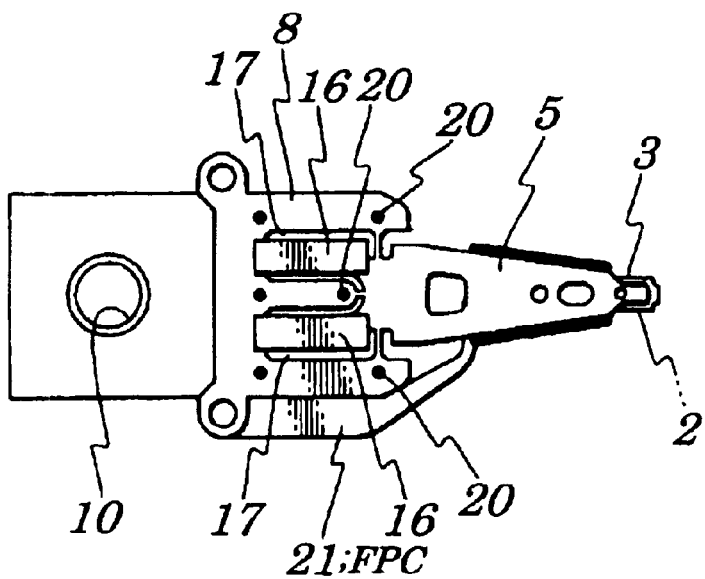
FIG. 6C is a back view of the fine actuator section of the magnetic head positioning mechanism according to the second embodiment.
Figure 8A:
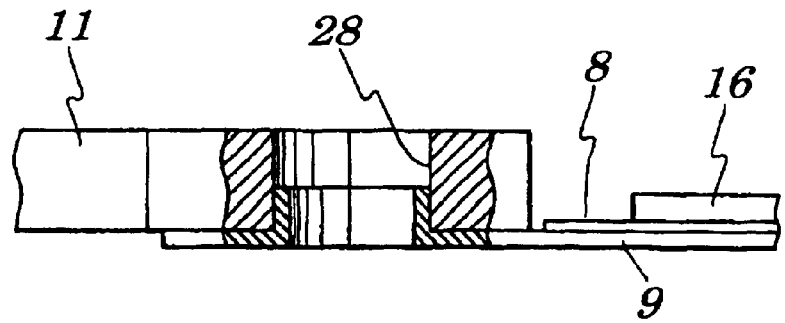
FIGS. 8A and 8B are sectional side views of the fine actuator section explaining effects attained by the second embodiment.
Figure 8B:
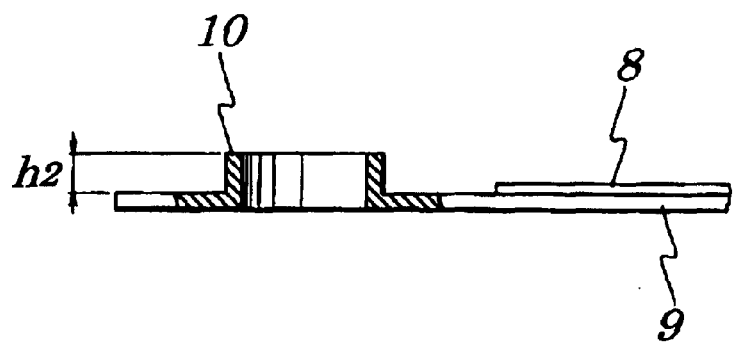
Figure 8C:
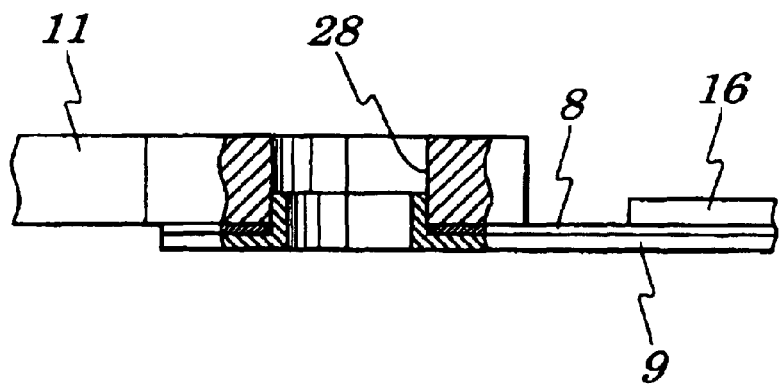
FIGS. 8C and 8D are sectional side views of configurations of the fine actuator section of the first embodiment used for comparison of effects of the first embodiment with those obtained by the second embodiment of the present invention.
Figure 8D:
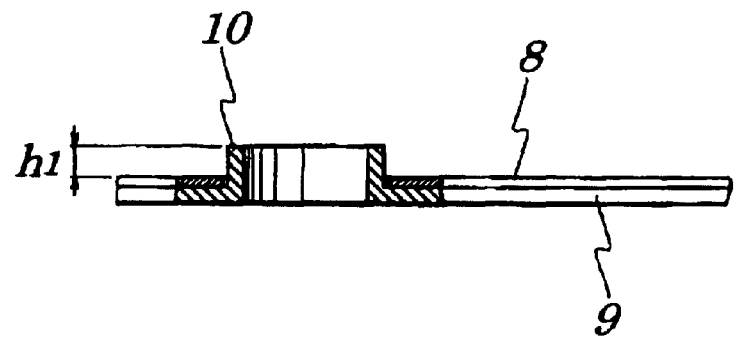

FIGS. 6A, 6B and 6C are top, side and back views of a fine actuator section, respectively, of a magnetic head positioning mechanism of a second embodiment of the present invention. FIG. 7 is a diagram showing configurations of parts constituting the fine actuator section of the magnetic head positioning mechanism of the second embodiment. FIGS. 8A and 8B are sectional side views of the fine actuator section explaining effects attained by the second embodiment and FIGS. 8C and 8D are sectional side views of the fine actuator section of the first embodiment used for comparison of effects of the first embodiment with those obtained by the second embodiment. Configurations of the second embodiment are almost same as those of the first embodiment except the fine actuator section. In the second embodiment, same reference numbers as for the first embodiment are assigned to parts and sections having same functions as in the first embodiment.

In the first embodiment, actuator spring 8 and base plate 9 constituting a fine actuator section 6 are laid in a manner so that they overlap each other and, as shown in FIG. 8C, a boss section 10 of the base plate 9 is passed through a through hole formed in the actuator spring 8 and then is fitted into a holder arm mounting hole 28 of holder arm 11. However, in the above configurations of the first embodiment, since height (h1) of the boss section 10 as shown in FIG. 8D is structurally reduced by plate thickness of the actuator spring 8 and thus height of fitting the boss section 10 into the holder arm mounting hole 28 of the holder arm 11 is also made smaller, sufficient fitting strength cannot be obtained, causing the risk of interfering with satisfactory assembling of the fine actuator-section 6.

To solve this problem, as already described above, assembling method is available in which the actuator spring 8 is mounted on a storage medium 27 side and the base plate 9 is junctioned to the holder arm 11. However, in this method, since the piezo-electric elements 16 also have to be mounted on the storage medium 27 side, unless the magnetic head positioning mechanism has sufficient mounting height at its fine actuator section 6, it is difficult to ensure a margin of safety against electrical short-circuit and/or physical contact between the piezo-electric elements 16 and the storage medium 27.

Thus, according to the second embodiment, the portion in which the actuator spring 8 and the holder arm 11 overlaps in the first embodiment is removed as shown in FIGS. 6B and 6C and, when the actuator spring 8 is laid on the base plate 9 having the boss section 10, laser spot welding is carried out only on portions surrounding driving voids 17 which are shown as jwelding points 20, as shown in FIGS. 6A and 6C.

Since an external area of a driving spring section 23, that is, a root area of a center spring 18 and side springs 19 is reinforced by the base plate 9 as in the first embodiment, it is possible to ensure sufficient bending and torsional stiffness in the fine actuator section 6.

Moreover, as shown in FIG. 8B, in the configurations according to the second embodiment, since the actuator spring 809694171 does not contact the holder arm 11, a sufficient height (h2) of the boss section 10 can be ensured after it is connected to the holder arm 11 and thus excellent fitting strength can be obtained.

Third Embodiment

Figure 9A:
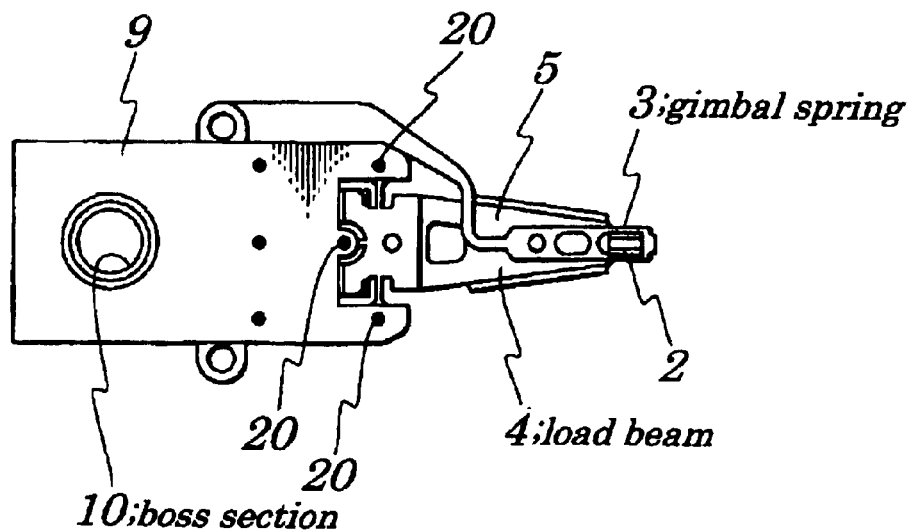
FIG. 9A is a top view of a fine actuator section of a magnetic head positioning mechanism according to a third embodiment of the present invention.
Figure 9B:
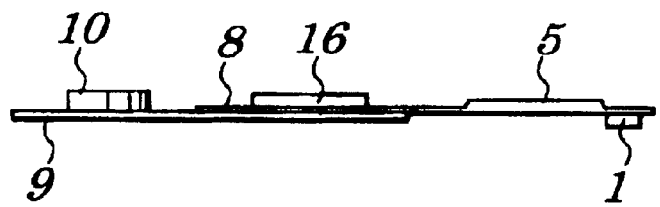
FIG. 9B is a side view of the fine actuator section of the magnetic head positioning mechanism according to the third embodiment.
Figure 9C:
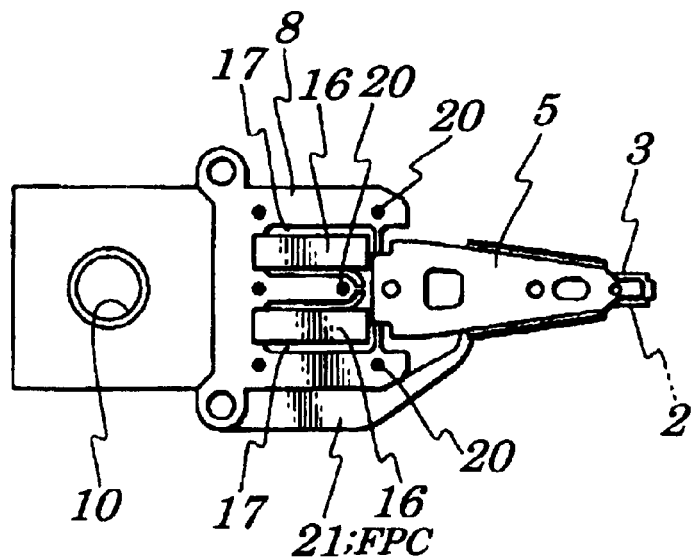
FIG. 9C is a back view of the fine actuator section of the magnetic head positioning mechanism according to the third embodiment.
Figure 10:
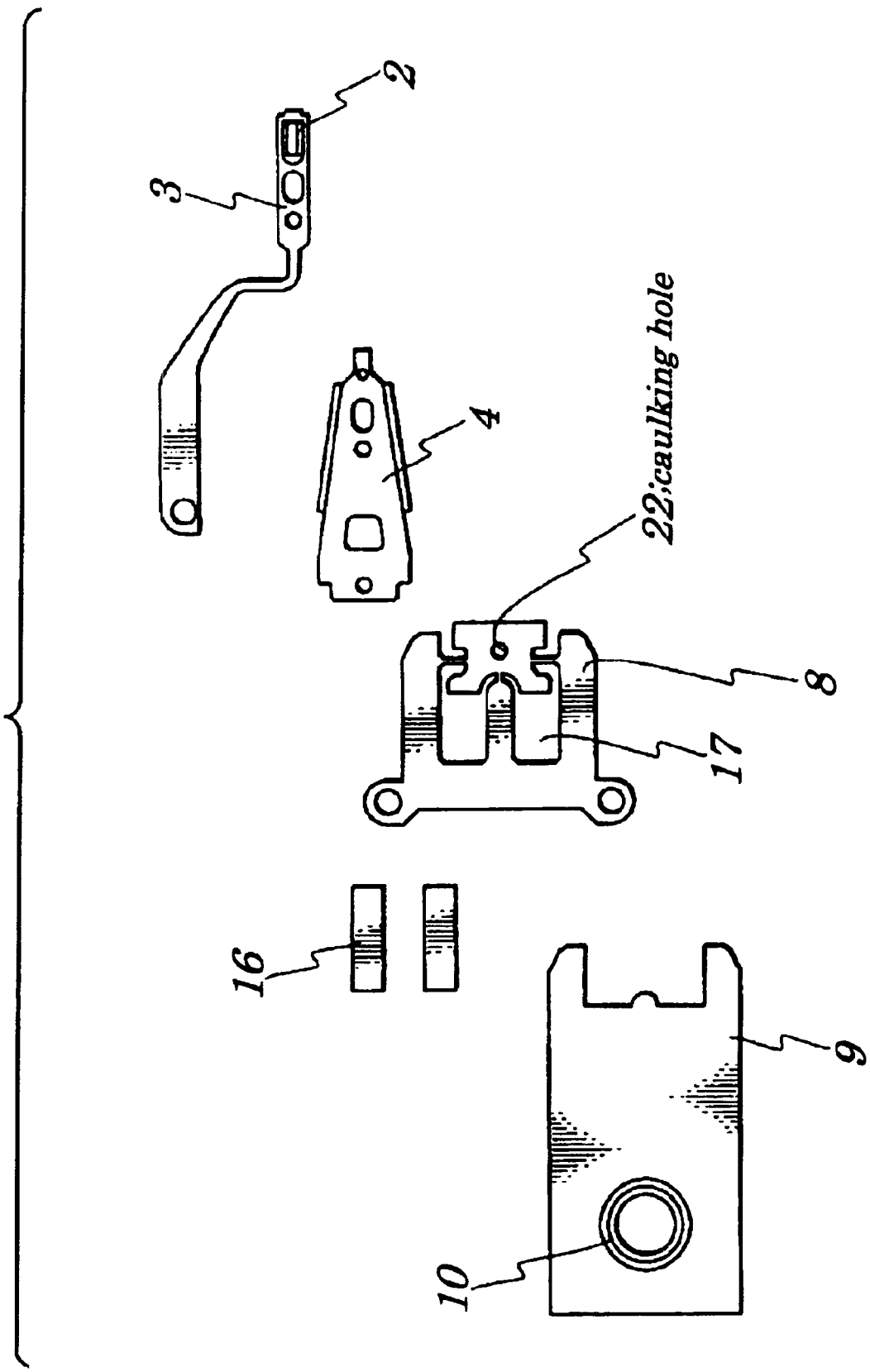
FIG. 10 is a diagram showing configurations of parts constituting the fine actuator section of the magnetic head positioning mechanism of the third embodiment of the present invention.

FIGS. 9A, 9B and 9C are top, side and back views of a fine actuator section, respectively, of a magnetic head positioning mechanism of a third embodiment of the present invention. FIG. 10 is a diagram showing configurations of parts constituting the fine actuator section of the magnetic head positioning mechanism of the third embodiment. In the third embodiment, same reference numbers as for the first embodiment are assigned to parts and sections having same functions as in the first embodiment.

In the first and second embodiments, a load beam 4 constituting a fine actuator section 6 is integrally formed with an actuator spring 8 composed of one thin steel plate to obtain assembly workability. In the third embodiment, as shown in FIG. 10, the actuator spring 8 and load beam 4 are separately formed and assembled independently.

In this method, though assembling workability is impaired somewhat due to increased numbers of parts, there are still advantages in that the load beam 4 and the conventional magnetic head supporting section 5, each existing as a separate unit, can be used as they are without needs for integral formation. The load beam 4 can be simply mounted via a caulking hole 22 formed in the actuator spring 8, by using a rivet or a like, on the actuator spring 8.

An overall configuration of the fine actuator section 6 of the third embodiment achieved after being assembled is the same as those in the first and second embodiments as shown in FIGS. 9A, 9B and 9C.

Fourth Embodiment

Figure 11A:
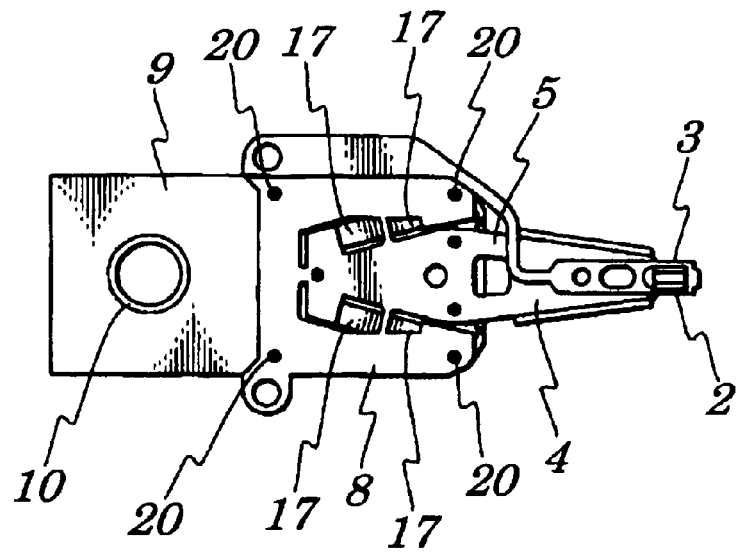
FIG. 11A is a top view of a fine actuator section of a magnetic head positioning mechanism according to a fourth embodiment of the present invention.
Figure 11B:
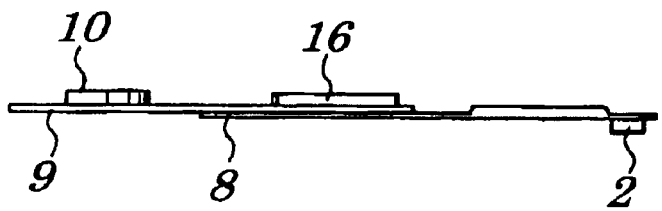
FIG. 11B is a side view of the fine actuator section of the magnetic head positioning mechanism according to the fourth embodiment of the present invention.
Figure 11C:
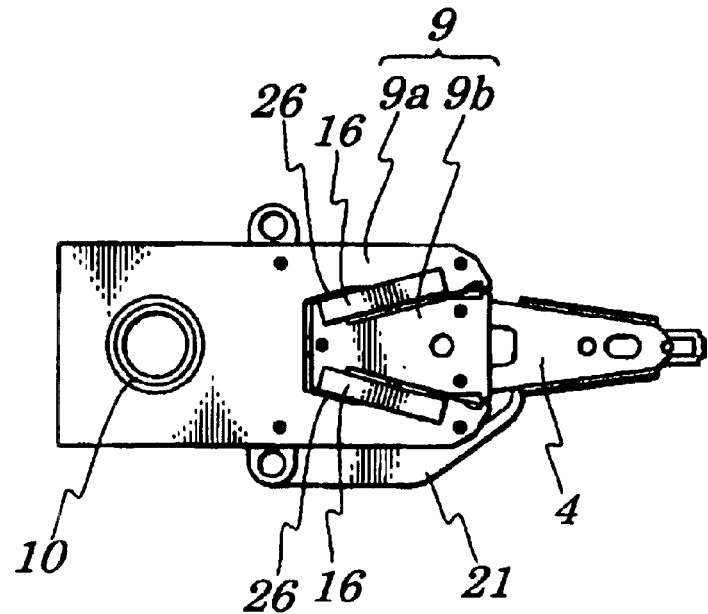
FIG. 11C is a back view of the fine actuator section of the magnetic head positioning mechanism according to the fourth embodiment of the present invention.

FIGS. 11A, 11B and 11C are top, side and back views of a fine actuator section, respectively, of a magnetic head positioning mechanism of a fourth embodiment of the present invention. FIG. 12 is a diagram showing configurations of parts constituting the fine actuator section of the magnetic head positioning mechanism of the fourth embodiment. In the fourth embodiment, same reference numbers as for the first embodiment are assigned to parts and sections having same functions as in the first embodiment.

As shown in FIGS. 11A and 1C, a fine actuator section 6 of the fourth embodiment is composed of an actuator spring 8, piezo-electric elements 16 and a base plate 9. The actuator spring 8 composed of one steel plate is integrally formed with a load beam 4. A gimbal spring 3 holding a slider 2 and the load beam 4 constitute, in combination, a magnetic head supporting section 5. A pair of driving voids 17 is formed on the actuator spring 8 on both sides of a mounting place of the load beam 4 in a state being symmetrical right and left with respect to a center axis of the actuator spring 8. The driving voids 17 are formed so as to be intersected in a slanting direction in a manner that a distance between the driving voids 17 is increased gradually toward a magnetic head 1 from a holder arm 11 side and, as a result, a transverse width of the load beam 4 constituting the magnetic head supporting section 5 is largest at a central position in a longitudinal direction.

As shown in FIG. 12, a driving spring section 23 composed of one center spring 18 and a pair of side springs 19 is formed on the actuator spring 8. The center spring 18 is composed of one short I-shaped plate spring which connects the load beam 4 to the actuator spring 8 at an end, being nearer the holder arm 11, of the load beam 4 constituting a part of the magnetic head supporting section 5. Each of the side springs 19 composed of long I-shaped springs is mounted, straddling the driving void 17, in a direction intersecting at right angles with respect to a longitudinal direction of the driving void 17 and connects the load beam 4 and the actuator spring 8.

The base plate 9 and the actuator spring 8 are laid so that they overlap each other. On the base plate 9 is formed second driving voids 26 which are equivalent to the driving voids 17 formed in the actuator spring 8. The base plate 9 is divided by the second driving voids 26 into an internal part and an external part. The external part becomes a main part 9a of the base plate 9 and an inner part becomes a driving stage 9b in a state in which the inner part is nested.

A base bridge section 25 adapted to connect the main part 9a of the base plate 9 to the driving stage 9b is left in a state shown in FIG. 12 to obtain easiness for working and assembly and to ensure accuracy until welding on each part is complete.

As shown in FIG. 1C, the main part 9a of the base plate 9 is junctioned to the actuator spring 8 by carrying out a laser spot welding at welding points 20. The driving stage 9b is also junctioned to the load beam 4 by carrying out laser spot welding at two or more welding points 20. After the above welding processes are complete, a pair of the piezo-electric elements 16 is disposed, straddling the second driving voids 26 in a longitudinal direction, on the main part 9a of the base plate 9 and the driving stage 9b along both sides of the mounting position for the load beam 4. As shown in FIG. 1C, both sides of each of the piezo-electric elements 16 are junctioned to the main part 9a of the base plate 9 and the driving stage 9b and finally the base bridge section 25 is cut in a manner shown in FIG. 1C.

Since the side spring 19, as described above, is mounted so as to intersect at right angles to the longitudinal direction of the driving voids 17 formed along the mounting position for the load beam 4 and since each of the piezo-electric elements 16 is mounted along the longitudinal direction of the second driving void 26, that is, along the longitudinal direction of the driving void 17, the side spring 9 and the piezo-electric element 16, as a result, almost intersect each other at right angles.

Figure 13A:
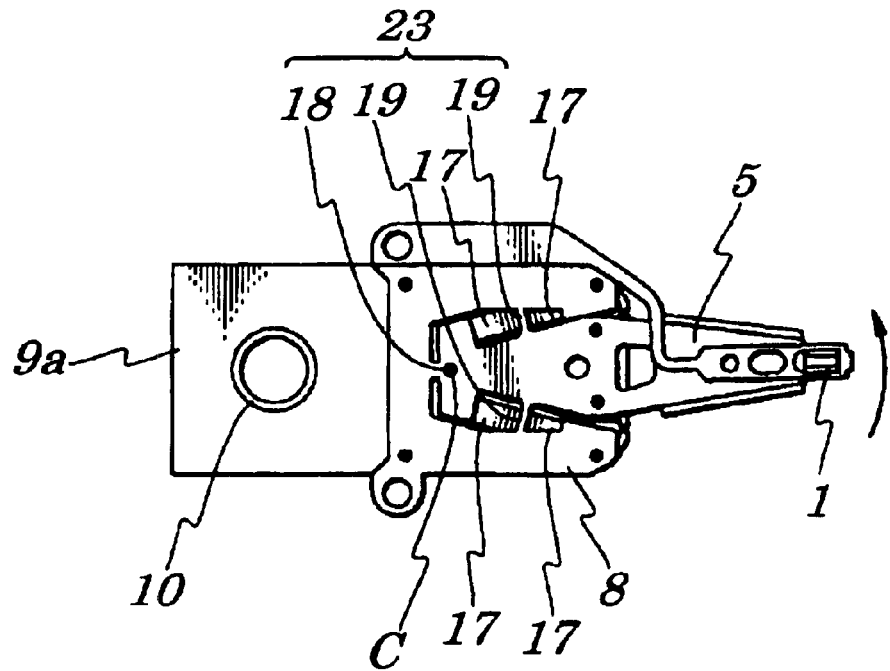
FIGS. 13A and 13B are top views explaining an operational principle of the magnetic head positioning mechanism of the fourth embodiment of the present invention.

Next, an operation principle of the magnetic head positioning mechanism of the fourth embodiment will be described by referring to FIGS. 13A and 13B. FIG. 13A is a top view of the fine actuator section of the fourth embodiment, seen from a storage medium side, to explain its operation and FIG. 13B is a top view of the fine actuator section seen from a holder arm side.

When driving power is applied to the pair of the piezo-electric elements 16 mounted, with a center axis of the main part 9a of the base plate 9 being interposed between the piezo-electric elements 16, in a manner that each of them has an opposite phase, each of the piezo-electric element 16, an "A" portion of which is fixed to the base plate 9 being nearer to the magnetic head 1, expands a "B" portion of the piezo-electric element 16 which is connected, straddling the driving void 26, to the driving stage 9b and makes flexible the side spring 19 and the center spring 18, which causes the magnetic head supporting section 5 together with the driving stage 9b to be rotated using a "C" as a rotation center axis and causes the magnetic head 1 to perform following operation on a track. FIG. 13B shows an example of operations in which the piezo-electric element 16 placed in a lower position is expanded and the piezo-electric element 16 placed in a higher position is shrunk.

Figure 13B:
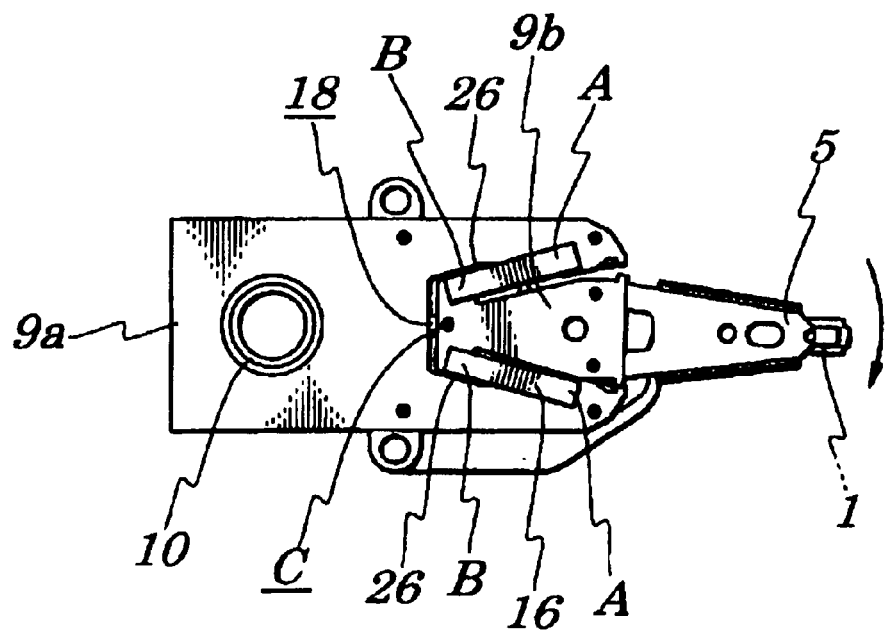
Figure 14A:
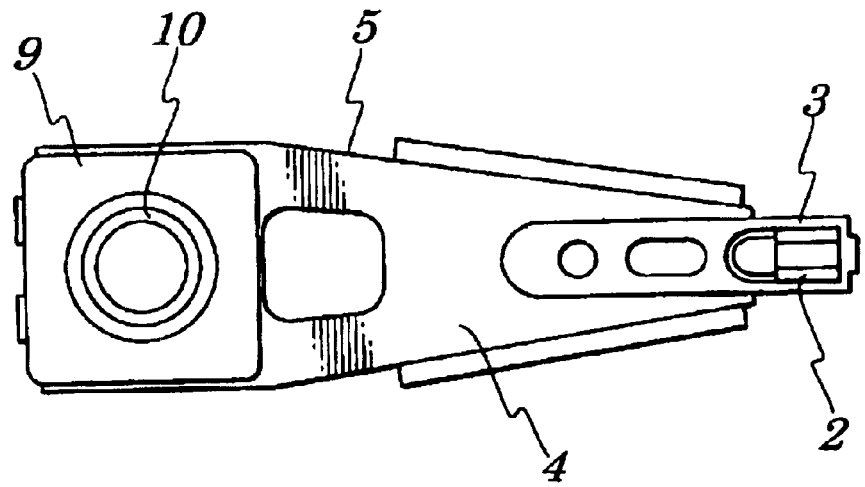
FIG. 14A is a top view showing a magnetic head supporting section constituting a conventional magnetic head positioning mechanism.
Figure 14B:
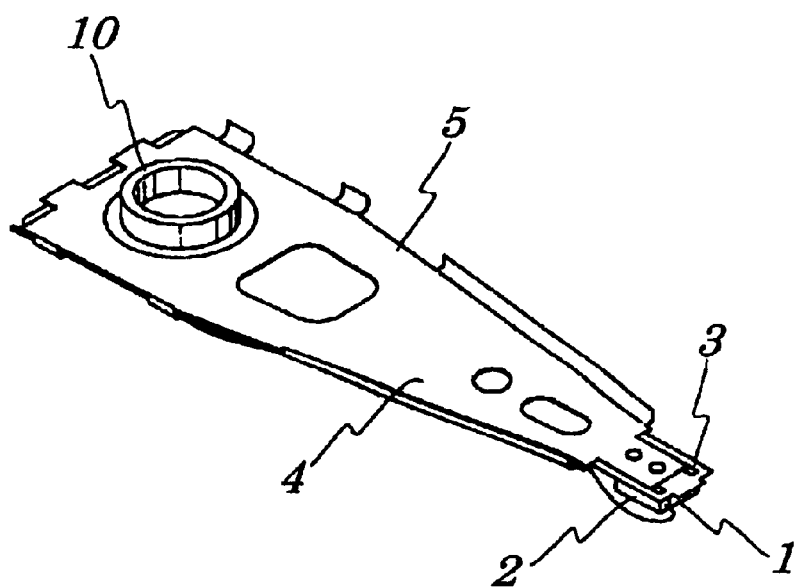
FIG. 14B is a perspective view showing the magnetic head supporting section of the conventional magnetic head positioning mechanism.
Figure 14C:
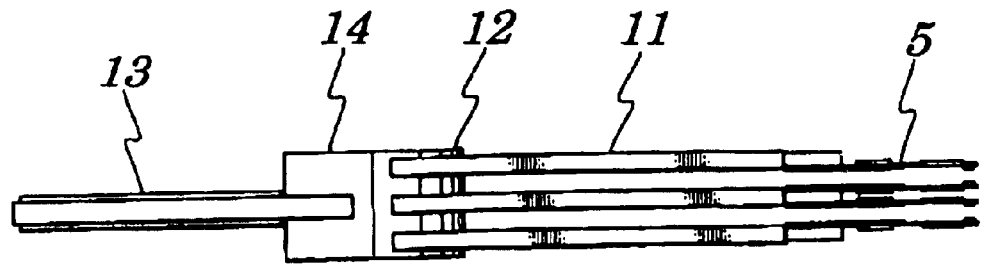
FIG. 14C is a side view showing overall configurations of the conventional magnetic head positioning mechanism.
Figure 15:
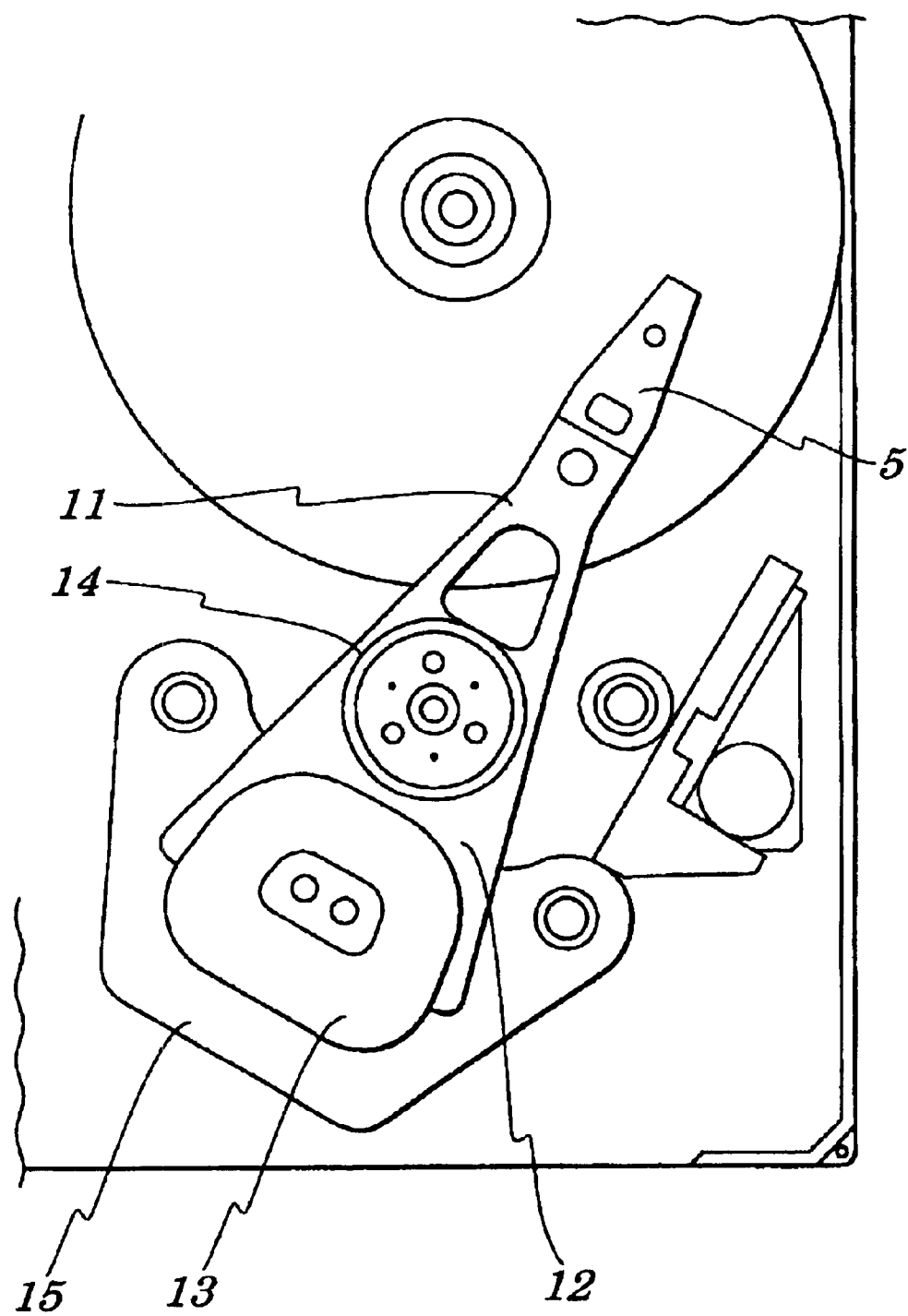
FIG. 15 is a top view showing main portions of a conventional disk device.

In the magnetic head positioning mechanism of the embodiment, as shown in FIGS. 13A and 13B, since the driving rotation center "C" position of the magnetic head supporting section 5 can be disposed apart from the magnetic head 1 as much as possible, by increasing a driving multiplying factor, that is, an amount of driving of the magnetic head 1 to an amount of distortion of the piezo-electric element 16, a wide movable range for the magnetic head 1 can be ensured, thus providing satisfactory magnetic head 1 positioning accuracy.

Moreover, according to the embodiment, since the fine actuator section 6 is so constructed that the side springs 19 are mounted so as to straddle the driving voids 17 and second driving void 26 and the piezo-electric elements 16 are overlaid on the side spring 19, the driving spring section 23 can be designed to be compact to keep its rotary stiffness decreased and can be reinforced by the main part 9a of the base plate 9 and the driving stage 9b to ensure sufficient stiffness, thus providing excellent shock-resistance and load/unload durability of the magnetic head positioning mechanism.

As described above, according to the present invention, since the magnetic head positioning mechanism is so configured that the base plate composed of the thick steel plate is incorporated so as to cover the driving voids formed in the actuator spring, it is possible to ensure stiffness of the actuator spring in the vertical direction, shock-resistance and load/unload durability without increased stiffness of the driving spring section even if sufficient driving voids are provided in the actuator spring and to obtain satisfactory driving stroke to the magnetic head driving direction and excellent positioning accuracy.

Also, according to the present invention, since the magnetic head positioning mechanism is so constructed that the base plate is junctioned to the actuator spring, with the portion of the base plate on the magnetic head supporting section being opened and in the manner that the driving spring section of the actuator spring is surrounded, interference among the driving spring section, the magnetic head supporting section and the base plate can be surely prevented, thus reducing resistance in the direction of the magnetic head driving in the magnetic head supporting section and providing more accurate positioning.

Moreover, according to the present invention, since the magnetic head positioning mechanism is so constructed that the base plate being overlaid by the actuator spring is junctioned to the actuator spring at the root area of the center spring and side spring constituting the driving spring section, that is, at a place where stresses centralize most in the actuator spring, the stiffness of the actuator spring in the vertical direction is improved and deformation of the actuator spring can be prevented effectively.

Also, according to the present invention, since the magnetic head positioning mechanism is so constructed that the driving voids to absorb vibration of the magnetic head supporting section and extension/shrinkage of the piezo-electric elements are formed on both sides of the mounting place of the magnetic head supporting section in the state being symmetrical to the right and left with respect to the center axis of the actuator spring and the piezo-electric elements are mounted so as to straddle these driving voids, the mounting base of the magnetic head supporting section, the driving voids, and piezo-electric elements can be arranged in transverse direction with respect to the center axis of the actuator spring, thus greatly reducing the overall size of the magnetic head supporting section, its strength in particular. In this case, by mounting one of the plate springs constituting the driving spring section of the actuator spring at the end being nearer to the holder arm in the magnetic head supporting section, the magnetic head supporting section can be vibrated, over a long span, around the end portion being nearer to the holder arm of the magnetic head supporting section. This allows moving range of the magnetic head attached to the end of the magnetic head supporting section to be made larger, thus providing stable magnetic head positioning.

Also, according to the present invention, since the magnetic head positioning mechanism is so constructed that the part of the base plate on which the magnetic head supporting section is laid is separated from the main part of the base plate in the state in which the separated part of the base plate is nested in the main part of the base plate and is junctioned to the magnetic head supporting section, the base portion of the magnetic head supporting section is reinforced by the thick steel plate, thus serving to improve the stiffness of the magnetic head supporting section in the vertical direction.

Moreover, according to the present invention, since the magnetic head positioning mechanism is so constructed that the driving voids are formed so as to be intersected in the slanting direction in the manner that the distance between the driving voids is increased gradually toward the magnetic head from the holder arm side, the transverse width of the magnetic head supporting section at the center in the longitudinal direction can be made larger, thus ensuring the stiffness of the magnetic supporting section even when it is vibrated in the long span.

Also, according to the present invention, since the magnetic head positioning mechanism is so constructed that the length of the actuator spring is so set that the actuator spring and the holder arm do not overlap when the base plate is connected to the holder arm, it is possible to make the fine actuator section thinner, which enables the fine actuator section to be mounted even among narrow plates in the positioning device, thus serving to miniaturize the entire magnetic disk.

Furthermore, according to the present invention, the magnetic head positioning mechanism is so constructed that the boss section used to connect the fine actuator section to the holder arm is mounted on the base plate side where the base plate is junctioned to the actuator spring and where plastic working can be carried out easily, working of the boss section is made easier and productivity of the positioning device can be improved and, since the positioning mechanism is so configured that the actuator spring is not interposed between the base plate and holder arm, the boss section of the base plate is provided with sufficient amounts of projection, thus improving the junction strength between the fine actuator section and the holder arm.

It is apparent that the present invention is not limited to the above embodiments but may be changed and modified without departing from the scope and spirit of the invention.

What is claimed is:

1. A two-stage actuator type magnetic head positioning mechanism comprising;
   a plurality of fine actuator sections which minutely drives, by a pair of piezo-electric elements mounted in said fine actuator sections, a magnetic head supporting section adapted to support a slider on which a magnetic head is attached;
   a plurality of holder arms to support each of said fine actuator sections;
   an arm block formed by integrally unifying said plurality of holder arms; and
   a voice coil motor to drive said arm block;
   wherein said fine actuator section is composed of an actuator spring made from one thin steel plate and a base plate made from one thick steel plate, both of which overlap each other,
   wherein a driving spring section being connected to said magnetic head supporting section is mounted on said actuator spring and, in a vicinity of said driving spring section, a pair of driving voids to absorb vibration of said magnetic head supporting section and extension/shrinkage of said piezo-electric elements along a longitudinal axis is formed in a state being symmetrical right and left and parallel with respect to a longitudinal center axis of said actuator spring,
   wherein both end portions of said pair of piezo-electric elements are connected to said magnetic head supporting section and to said actuator spring in a manner such that said end portions straddle each of said driving voids,
   wherein said base plate is junctioned to one face of said actuator spring in a manner such that said base plate covers said pair of driving voids,
   wherein said pair of driving voids to absorb vibration of said magnetic head supporting section and extension/shrinkage of said piezo-electric elements is formed at both sides of a mounting position of said magnetic head supporting section in said state being symmetrical right and left with respect to said center axis of said actuator spring, wherein
   each of said pair of piezo-electric elements is connected to said magnetic head supporting section and to said actuator spring in a manner such that each of said piezo-electric elements straddles each of said driving voids along both sides of said mounting position of said magnetic head supporting section, and
   said driving spring section is mounted between said actuator spring and said magnetic head supporting section, wherein
   a part of said base plate on which said magnetic supporting section is laid is separated from a main portion of said base plate in a state in which the separated part of said base plate is nested in said main portion of said base plate and is junctioned to said magnetic head supporting section and a pair of second driving voids being laid on said pair of driving voids so that said pair of second driving voids and said pair of driving voids overlap each other are formed between said portion of said base plate separated to be nested in said main portion of said base plate and said main portion of said base plate and wherein both end portions of each of said pair of piezoelectric elements are connected to said magnetic head supporting section and to said actuator spring through said portion of said base plate separated to be nested in said main portion of said base plate and said main portion of said base plate in a manner that each of said piezo-electric elements straddles each of said second driving voids.

2. The two-stage actuator type magnetic head positioning mechanism according to claim 1, wherein said driving spring section of said actuator spring is composed of a short plate spring and of a pair of side springs made from long plate springs, and wherein a center spring is disposed on said center axis of said actuator spring while each of said side springs is disposed, with said center spring interposed between said side springs, in a direction being intersected almost at right angles to said center axis of said actuator spring, and wherein said base plate is junctioned to said actuator spring, at least, at a root area of said center spring and said side springs.

3. The two-stage actuator type magnetic head positioning mechanism according to claim 1, wherein said driving spring section of said actuator spring is composed of said center spring made from one short plate spring and a pair of side springs made from long plate springs, and wherein said center spring is connected to said magnetic head supporting section-and to said actuator spring on said center axis of said actuator spring at an end portion of said magnetic head supporting section being nearer to said holder arm while each of said side springs is connected to said magnetic head supporting section and to said actuator spring in a manner such that each of said side springs straddles each of said driving voids and in a manner such that each of said side springs intersects almost at right angles to each of said piezo-electric elements.

4. The two-stage actuator type magnetic head positioning mechanism according to claim 1, wherein a boss section is formed on said base plate so that said base plate is connected to said holder arm.

5. A two-stage actuator type magnetic head positioning mechanism comprising:

a plurality of fine actuator sections which minutely drives, by a pair of piezo-electric elements mounted in said fine actuator sections, a magnetic head supporting section adapted to support a slider on which a magnetic head is attached;

a plurality of holder arms to support each of said fine actuator sections;

an arm block formed by integrally unifying said plurality of holder arms; and a voice coil motor to drive said arm block;

wherein said fine actuator section is composed of an actuator spring made from one thin steel plate and a base plate made from one thick steel plate, both of which overlap each other, wherein a driving spring section being connected to said magnetic head supporting section is mounted on said actuator spring and, in a vicinity of said driving spring section, a pair of driving voids to absorb vibration of said magnetic head supporting section and extension/shrinkage of said piezo-electric elements along a longitudinal axis is formed in a state being symmetrical right and left and parallel with respect to a longitudinal center axis of said actuator spring, wherein both end portions of said pair of piezoelectric elements are connected to said magnetic head supporting section and to said actuator spring in a manner such that said end portions straddle each of said driving voids, wherein said base plate is junctioned to one face of said actuator spring in a manner such that said base plate covers said pair of driving voids, wherein said base plate is opened at a place where said base plate and said magnetic head supporting section overlap each other and is junctioned to said actuator spring in a manner such that said base plate surrounds external edges of said driving spring section of said actuator spring, wherein said pair of driving voids to absorb vibration of said magnetic head supporting section and extension/shrinkage of said piezo-electric elements is formed at both sides of a mounting position of said magnetic head supporting section in said state being symmetrical right and left with respect to said center axis of said actuator spring, wherein each of said pair of piezoelectric elements is connected to said magnetic head supporting section and to said actuator spring in a manner such that each of said piezo-electric elements straddles each of said driving voids along both sides of said mounting position of said magnetic head supporting section, said driving spring section is mounted between said actuator spring and said magnetic head supporting section, and wherein a part of said base plate on which said magnetic supporting section is laid is separated from a main portion of said base plate in a state in which the separated part of said base plate is nested in said main portion of said base plate and is junctioned to said magnetic head supporting section and second driving voids being laid on said other driving voids so that said second driving voids and said other driving voids overlap each other are formed between said portion of said base plate separated to be nested in said main portion of said base plate and said main portion of said base plate and wherein both end portions of each of said pair of piezo-electric elements are connected to said magnetic head supporting section and to said actuator spring through said portion of said base plate separated to be nested in said main portion of said base plate and said main portion of said base plate in a manner that each of said piezo-electric elements straddles each of said second driving voids.

6. The two-stage actuator type magnetic head positioning mechanism according to claim 5, wherein said driving spring section of said actuator spring is composed of a short plate spring and of a pair of side springs made from long plate springs, and wherein said center spring is disposed on said center axis of said actuator spring while each of said side springs is disposed, with said center spring interposed between said side springs, in a direction being intersected almost at right angles to said center axis of said actuator spring, and wherein said base plate is junctioned to said actuator spring, at least, at a root area of said center spring and said side springs.

7. The two-stage actuator type magnetic head positioning mechanism according to claim 5, wherein said driving spring section of said actuator spring is composed of said center spring made from one short plate spring and a pair of side springs made from long plate springs, and wherein said center spring is connected to said magnetic head supporting section-and to said actuator spring on said center axis of said actuator spring at an end portion of said magnetic head supporting section being nearer to said holder arm while each of said side springs is connected to said magnetic head supporting section and to said actuator spring in a manner such that each of said side springs straddles each of said driving voids and in a manner such that each of said side springs intersects almost at right angles to each of said piezo-electric elements.

8. The two-stage actuator type magnetic head positioning mechanism according to claim 5, wherein a boss section is formed on said base plate so that said base plate is connected to said holder arm.

9. A two-stage actuator type magnetic head positioning mechanism comprising:

a plurality of fine actuator sections which minutely drives, by a pair of piezo-electric elements mounted in said fine actuator sections, a magnetic head supporting section adapted to support a slider on which a magnetic head is attached;

a plurality of holder arms to support each of said fine actuator sections;

an arm block formed by integrally unifying said plurality of holder arms; and a voice coil motor to drive said arm block;

wherein said fine actuator section is composed of an actuator spring made from one thin steel plate and a base plate made from one thick steel plate, both of which overlap each other, wherein a driving spring section being connected to said magnetic head supporting section is mounted on said actuator spring and, in a vicinity of said driving spring section, a pair of driving voids to absorb vibration of said magnetic head supporting section and extension/shrinkage of said piezoelectric elements along a longitudinal axis is formed in a state being symmetrical right and left and parallel with respect to a longitudinal center axis of said actuator spring, wherein both end portions of said pair of piezo-electric elements are connected to said magnetic head supporting section and to said actuator spring in a manner such that said end portions straddle each of said driving voids, wherein said base plate is junctioned to one face of said actuator spring in a manner such that said base plate covers said pair of driving voids, wherein said pair of driving voids to absorb vibration of said magnetic head supporting section and extension/shrinkage of said piezoelectric elements is formed at both sides of a mounting position of said magnetic head supporting section in said state being symmetrical right and left with respect to said center axis of said actuator spring, wherein each of said pair of piezoelectric elements is connected to said magnetic head supporting section and to said actuator spring in a manner such that each of said piezo electric elements straddles each of said driving voids along both sides of said mounting position of said magnetic head supporting section, and said driving spring section is mounted between said actuator spring and said magnetic head supporting section, and wherein said pair of driving voids are formed so as to be intersected in a slanting direction in a manner that a distance between said pair of driving voids is increased gradually toward said magnetic head from said holder arm side.

10. The two-stage actuator type magnetic head positioning mechanism according to claim 9, wherein said driving spring section of said actuator spring is composed of a short plate spring and of a pair of side springs made from long plate springs, wherein a center spring is disposed on said center axis of said actuator spring while each of said side springs is disposed, with said center spring interposed between said side springs, in a direction being intersected almost at right angles to said center axis of said actuator spring, and wherein said base plate is junctioned to said actuator spring, at least, at a root area of said center spring and said side springs.

11. The two-stage actuator type magnetic head positioning mechanism according to claim 9, wherein said driving spring section of said actuator spring is composed of said center spring made from one short plate spring and a pair of side springs made from long plate springs, and wherein said center spring is connected to said magnetic head supporting section-and to said actuator spring on said center axis of said actuator spring at an end portion of said magnetic head supporting section being nearer to said holder arm while each of said side springs is connected to said magnetic head supporting section and to said actuator spring in a manner such that each of said side springs straddles each of said driving voids and in a manner such that each of said side springs intersects almost at right angles to each of said piezo-electric elements.

12. The two-stage actuator type magnetic head positioning mechanism according to claim 9, wherein a boss section is formed on said base plate so that said base plate is connected to said holder arm.

13. A two-stage actuator type magnetic head positioning mechanism comprising:

a plurality of fine actuator sections which minutely drives, by a pair of piezo-electric elements mounted in said fine actuator sections, a magnetic head supporting section adapted to support a slider on which a magnetic head is attached;

a plurality of holder arms to support each of said fine actuator sections;

an arm block formed by integrally unifying said plurality of holder arms; and a voice coil motor to drive said arm block;

wherein said fine actuator section is composed of an actuator spring made from one thin steel plate and a base plate made from one thick steel plate, both of which overlap each other, wherein a driving spring section being connected to said magnetic head supporting section is mounted on said actuator spring and, in a vicinity of said driving spring section, a pair of driving voids to absorb vibration of said magnetic head supporting section and extension/shrinkage of said piezo-electric elements along a longitudinal axis is formed in a state being symmetrical right and left and parallel with respect to a longitudinal center axis of said actuator spring, wherein both end portions of said pair of piezo-electric elements are connected to said magnetic head supporting section and to said actuator spring in a manner such that said end portions straddle each of said driving voids, wherein said base plate is junctioned to one face of said actuator spring in a manner such that said base plate covers said pair of driving voids, wherein said base plate is opened at a place where said base plate and said magnetic head supporting section overlap each other and is junctioned to said actuator spring in a manner such that said base plate surrounds external edges of said driving spring section of said actuator spring, wherein said pair of driving voids to absorb vibration of said magnetic head supporting section and extension/shrinkage of said piezo-electric elements is formed at both sides of a mounting position of said magnetic head supporting section in said state being symmetrical right and left with respect to said center axis of said actuator spring, wherein each of said pair of piezoelectric elements is connected to said magnetic head supporting section and to said actuator spring in a manner such that each of said piezo-electric elements straddles each of said driving voids along both sides of said mounting position of said magnetic head supporting section, and said driving spring section is mounted between said actuator spring and said magnetic head supporting section, and wherein said pair of driving voids are formed so as to be intersected in a slanting direction in a manner that a distance between said pair of driving voids is increased gradually toward said magnetic head from said holder arm side.

14. The two-stage actuator type magnetic head positioning mechanism according to claim 13, wherein said driving spring section of said actuator spring is composed of a short plate spring and of a pair of side springs made from long plate springs, wherein said center spring is disposed on said center axis of said actuator spring while each of said side springs is disposed, with said center spring interposed between said side springs, in a direction being intersected almost at right angles to said center axis of said actuator spring, wherein said base plate is junctioned to said actuator spring, at least, at a root area of said center spring and said side springs.

15. The two-stage actuator type magnetic head positioning mechanism according to claim 13, wherein said driving spring section of said actuator spring is composed of said center spring made from one short plate spring and a pair of side springs made from long plate springs, and wherein said center spring is connected to said magnetic head supporting section and to said actuator spring on said center axis of said actuator spring at an end portion of said magnetic head supporting section being nearer to said holder arm while each of said side springs is connected to said magnetic head supporting section and to said actuator spring in a manner such that each of said side springs straddles each of said driving voids and in a manner such that each of said side springs intersects almost at right angles to each of said piezo-electric elements.

16. The two-stage actuator type magnetic head positioning mechanism according to claim 13, wherein a boss section is formed on said base plate so that said base plate is connected to said holder arm.

17. A two-stage actuator type magnetic head positioning mechanism comprising:

a plurality of fine actuator sections which minutely drives, by a pair of piezo-electric elements mounted in said fine actuator sections, a magnetic head supporting section adapted to support a slider on which a magnetic head is attached;

a plurality of holder arms to support each of said fine actuator sections;

an arm block formed by integrally unifying said plurality of holder arms; and a voice coil motor to drive said arm block;

wherein said fine actuator section is composed of an actuator spring made from one thin steel plate and a base plate made from one thick steel plate, both of which overlap each other, wherein a driving spring section being connected to said magnetic head supporting section is mounted on said actuator spring and, in a vicinity of said driving spring section, a pair of driving voids to absorb vibration of said magnetic head supporting section and extension/shrinkage of said piezoelectric elements along a longitudinal axis is formed in a state being symmetrical right and left and parallel with respect to a longitudinal center axis of said actuator spring, wherein both end portions of said pair of piezoelectric elements are connected to said magnetic head supporting section and to said actuator spring in a manner such that said end portions straddle each of said driving voids, wherein said base plate is junctioned to one face of said actuator spring in a manner such that said base plate covers said pair of driving voids, wherein said pair of driving voids to absorb vibration of said magnetic head supporting section and extension/shrinkage of said piezoelectric elements is formed at both sides of a mounting position of said magnetic head supporting section in said state being symmetrical right and left with respect to said center axis of said actuator spring, wherein each of said pair of piezoelectric elements is connected to said magnetic head supporting section and to said actuator spring in a manner such that each of said piezo-electric elements straddles each of said driving voids along both sides of said mounting position of said magnetic head supporting section, and said driving spring section is mounted between said actuator spring and said magnetic head supporting section, and wherein length of said actuator spring is set so as to end at a tip of said holder arm so that said actuator spring being junctioned to said base plate and said holder arm do not overlap each other when said base plate is connected to said holder arm.

18. The two-stage actuator type magnetic head positioning mechanism according to claim 17, wherein said driving spring section of said actuator spring is composed of a short plate spring and of a pair of side springs made from long plate springs, wherein a center spring is disposed on said center axis of said actuator spring while each of said side springs is disposed, with said center spring interposed between said side springs, in a direction being intersected almost at right angles to said center axis of said actuator spring, and wherein said base plate is junctioned to said actuator spring, at least, at a root area of said center spring and said side springs.

19. The two-stage actuator type magnetic head positioning mechanism according to claim 17, wherein said driving spring section of said actuator spring is composed of said center spring made from one short plate spring and a pair of side springs made from long plate springs, and wherein said center spring is connected to said magnetic head supporting section-and to said actuator spring on said center axis of said actuator spring at an end portion of said magnetic head supporting section being nearer to said holder arm while each of said side springs is connected to said magnetic head supporting section and to said actuator spring in a manner such that each of said side springs straddles each of said driving voids and in a manner such that each of said side springs intersects almost at right angles to each of said piezo-electric elements.

20. The two-stage actuator type magnetic head positioning mechanism according to claim 17, wherein a boss section is formed on said base plate so that said base plate is connected to said holder arm.

21. A two-stage actuator type magnetic head positioning mechanism comprising:

a plurality of fine actuator sections which minutely drives, by a pair of piezo-electric elements mounted in said fine actuator sections, a magnetic head supporting section adapted to support a slider on which a magnetic head is attached;

a plurality of holder arms to support each of said fine actuator sections;

an arm block formed by integrally unifying said plurality of holder arms; and a voice coil motor to drive said arm block;

wherein said fine actuator section is composed of an actuator spring made from one thin steel plate and a base plate made from one thick steel plate, both of which overlap each other, wherein a driving spring section being connected to said magnetic head supporting section is mounted on said actuator spring and, in a vicinity of said driving spring section, a pair of driving voids to absorb vibration of said magnetic head supporting section and extension/shrinkage of said piezo-electric elements along a longitudinal axis is formed in a state being symmetrical right and left and parallel with respect to a longitudinal center axis of said actuator spring, wherein both end portions of said pair of piezo-electric elements are connected to said magnetic head supporting section and to said actuator spring in a manner such that said end portions straddle each of said driving voids, wherein said base plate is junctioned to one face of said actuator spring in a manner such that said base plate covers said pair of driving voids, wherein said base plate is opened at a place where said base plate and said magnetic head supporting section overlap each other and is junctioned to said actuator spring in a manner such that said base plate surrounds external edges of said driving spring section of said actuator spring, wherein said pair of driving voids to absorb vibration of said magnetic head supporting section and extension/shrinkage of said piezo electric elements is formed at both sides of a mounting position of said magnetic head supporting section in said state being symmetrical right and left with respect to said center axis of said actuator spring, and wherein each of said pair of piezo-electric elements is connected to said magnetic head supporting section and to said actuator spring in a manner such that each of said piezo-electric elements straddles each of said driving voids along both sides of said mounting position of said magnetic head supporting section, and said driving spring section is mounted between said actuator spring and said magnetic head supporting section, and wherein length of said actuator spring is set so as to end at a tip of said holder arm so that said actuator spring being junctioned to said base plate and said holder arm do not overlap each other when said base plate is connected to said holder arm.

22. The two-stage actuator type magnetic head positioning mechanism according to claim 21, wherein said driving spring section of said actuator spring is composed of a short plate spring and of a pair of side springs made from long plate springs, wherein said center spring is disposed on said center axis of said actuator spring while each of said side springs is disposed, with said center spring interposed between said side springs, in a direction being intersected almost at right angles to said center axis of said actuator spring, and wherein said base plate is junctioned to said actuator spring, at least, at a root area of said center spring and said side springs.

23. The two-stage actuator type magnetic head positioning mechanism according to claim 21, wherein said driving spring section of said actuator spring is composed of said center spring made from one short plate spring and a pair of side springs made from long plate springs, and wherein said center spring is connected to said magnetic head supporting section and to said actuator spring on said center axis of said actuator spring at an end portion of said magnetic head supporting section being nearer to said holder arm while each of said side springs is connected to said magnetic head supporting section and to said actuator spring in a manner such that each of said side springs straddles each of said driving voids and in a manner such that each of said side springs intersects almost at right angles to each of said piezo-electric elements.

24. The two-stage actuator type magnetic head positioning mechanism according to claim 21, wherein a boss section is formed on said base plate so that said base plate is connected to said holder arm.

* * * * *